(12) United States Patent
Kim et al.

(10) Patent No.: US 10,403,415 B2
(45) Date of Patent: Sep. 3, 2019

(54) TRANSPARENT ELECTRODE HAVING REDUCED OPTICAL REFLECTANCE AND TRANSPARENT ELECTRODE MANUFACTURING METHOD USING PRINTING PROCESS

(71) Applicant: KYUNGPOOK NATIONAL UNIVERSITY INDUSTRY-ACADEMIC COOPERATION FOUNDATION, Daegu (KR)

(72) Inventors: Hak-Rin Kim, Daegu (KR); Ji-Sub Park, Daegu (KR); Jun-Chan Choi, Gyeongju-si (KR)

(73) Assignee: KYUNGPOOK NATIONAL UNIVERSITY INDUSTRY-ACADEMIC COOPERATION FOUNDATION, Daehak-Ro, Buk-Gu Daegu (KR)

( * ) Notice: Subject to any disclaimer, the term of this patent is extended or adjusted under 35 U.S.C. 154(b) by 248 days.

(21) Appl. No.: 15/472,664

(22) Filed: Mar. 29, 2017

(65) Prior Publication Data

US 2017/0200525 A1 Jul. 13, 2017

Related U.S. Application Data

(62) Division of application No. PCT/KR2015/009677, filed on Sep. 15, 2015.

(30) Foreign Application Priority Data

Sep. 30, 2014 (KR) .................. 10-2014-0131894
Sep. 30, 2014 (KR) .................. 10-2014-0131895

(51) Int. Cl.
*H01B 1/02* (2006.01)
*G06F 3/041* (2006.01)
(Continued)

(52) U.S. Cl.
CPC ............ *H01B 1/02* (2013.01); *G06F 3/041* (2013.01); *H01B 13/0016* (2013.01);
(Continued)

(58) Field of Classification Search
CPC .......... G06F 3/041; G06F 2203/04112; G06F 2203/04103; B82Y 30/00; B82Y 40/00;
(Continued)

(56) References Cited

U.S. PATENT DOCUMENTS

2011/0003086 A1* 1/2011 Chung ................. H05K 1/097
427/555
2013/0277100 A1* 10/2013 Ra .......................... H05K 3/06
174/268

FOREIGN PATENT DOCUMENTS

JP 2010205961 9/2010
JP 2011082211 4/2011
(Continued)

OTHER PUBLICATIONS

International Search Report—PCT/KR2015/009677 dated Jan. 20, 2016.

*Primary Examiner* — Charles V Hicks
(74) *Attorney, Agent, or Firm* — Cantor Colburn LLP

(57) ABSTRACT

In a transparent electrode based on a metal material having reduced light reflectance, a light absorbing layer having black characteristic is formed on a lower surface, a partition wall, and/or an upper surface of a metal wire, and thus, light reflectance of transparent electrode is minimized. In a method of manufacturing a transparent electrode, the light absorbing layer can be selectively formed on the upper and lower surfaces and the partition wall of the metal wire having a fine line width by using self-aligning and a spontaneous pattern effect. A conductive wire is implemented by using an imprinting process using an elastic body-based stamp, and thus, conductive wires having a fine line width
(Continued)

and an excellent aspect ratio can be formed, so that it is possible to improve electric conductivity and transmittance.

15 Claims, 27 Drawing Sheets

(51) Int. Cl.
*H01B 13/00* (2006.01)
*B82Y 30/00* (2011.01)
*B82Y 40/00* (2011.01)

(52) U.S. Cl.
CPC .......... *H01B 13/0036* (2013.01); *B82Y 30/00* (2013.01); *B82Y 40/00* (2013.01); *G06F 2203/04103* (2013.01); *G06F 2203/04112* (2013.01); *Y10S 977/762* (2013.01); *Y10S 977/773* (2013.01)

(58) Field of Classification Search
CPC .. H01B 1/02; H01B 13/0036; H01B 13/0016; Y10S 977/762; Y10S 977/773
See application file for complete search history.

(56) References Cited

FOREIGN PATENT DOCUMENTS

| | | |
|---|---|---|
| JP | 2013225276 | 10/2013 |
| JP | 2014519663 | 8/2014 |
| KR | 20090061225 | 6/2009 |

\* cited by examiner

TRANSPARENT ELECTRODE HAVING REDUCED OPTICAL REFLECTANCE AND TRANSPARENT ELECTRODE MANUFACTURING METHOD USING PRINTING PROCESS

TECHNICAL FIELD

The present invention relates to a transparent electrode having reduced light reflectance by forming a light absorbing layer having black characteristic on a surface of a metal wire constituting a transparent electrode, a transparent electrode including a conductive wire having a fine line width and a high aspect ratio in a mesh structure, and a method of manufacturing the transparent electrode by using a printing process.

BACKGROUND ART

Recently, with the development of various mobile devices and IT devices, in addition to a keyboard and a mouse, various types of easy-to-use and efficient input devices have been used for easy-to-use and efficient input. In particular, the most commonly used input device is a touch screen panel.

Such a touch screen panel is provided on a display surface of an image display device such as a smart phone, an electronic notebook, a computer, or a terminal so that a user can easily input or select desired information while viewing an image.

The above-described touch screen panel requires a transparent electrode in a form of a surface electrode having overall transmittance and electrical conductivity in order to sense user's touch. In the related art, techniques of depositing indium tin oxide (ITO) that is an inorganic material as a transparent electrode have been mainly used. Although the ITO has excellent electrical conductivity, indium is a rare earth metal, and its price has sharply risen. Furthermore, since the ITO is manufactured through a deposition process, there is a problem in that the ITO has limitations in mass production and large area. Due to these problems, research and development of new materials substituted for the ITO and new processes has been urgently required.

As new materials substituted for the ITO, there have been proposed conductive inks in which metal nanoparticles are easily dispersed, metal nanowires, graphene, carbon nanotubes (CNT), conductive polymers, and the like. Among methods of using these materials, a method of forming a transparent electrode in which metal wires having a thin line width are formed in a metal mesh structure by using a conductive ink based on metal nanoparticles, a method of forming a transparent electrode by applying metal nanowire dispersion solution have drawn much attention as techniques for ITO substitution due to excellence in electric conductivity and simplicity of process.

However, an electrode made of metal has a problem that the electrode may be visually recognized by a user due to the opacity of metal and is difficult to be used as a transparent electrode. In order to solve such a problem and to prevent the electrode from being recognized by the user, a metal wire having a line width of micrometers which is difficult for the user to visually recognize may be formed in a mesh structure.

In this case, in order to improve transmittance as a main parameter of the transparent electrode formed with a mesh structure of the conductive wire and to secure excellent visibility to a image on a display so that the user cannot visually recognize the electrode, the line width of the conductive wire to be printed is required to be as fine as 3 µm or less.

As a typical process of forming a printing-based metal mesh satisfying the above-described condition of the line width of the wire, there are gravure printing and offset printing. These processes have an advantage in that the processes are excellent in mass productivity. However, as the line width of the conductive wire having a mesh structure is formed to be fine in order to improve the transmittance, the sheet resistance is increased and, thus, the conductivity is decreased. In other words, there is a trade-off relationship between the transmittance and the conductivity.

In order to solve the above-mentioned trade-off relationship between the transmittance and the conductivity, while allowing the line width of the conductive wire to be fine, the thickness of the conductive wire is required to be increased. However, in the gravure printing and offset printing in the related art, the thickness of the conductive wire may be limited to be in a range of several tens of nanometers to several hundreds of nanometers due to the viscosity and process limitations of the conductive solution to be printed.

Therefore, the printing process in the related art has a problem in that the process has limitations in improving the sheet resistance characteristic and realizing excellent conductivity in the formation of the fine conductive wire for improving the transmittance.

FIG. 1 is a cross-sectional diagram conceptually illustrating that natural light is reflected on a front surface, a side surface, or the like of a metal wire in a transparent electrode in which a metal wire is formed in a mesh structure in the related art. Since the transparent electrode element configured with the metal wire having a mesh based on the metal nanoparticles or the transparent electrode element based on the metal nanowires described above are made of a metal material having good reflectance with respect to light, as illustrated in FIG. 1, natural light is reflected on the front surface and the side surface of the transparent electrode elements. As a result, there is a problem in that the visibility is lowered.

DISCLOSURE

Technical Problem

In order to solve the aforementioned problems, the present invention is to provide a transparent electrode having reduced light reflectance of a metal wire by forming a light absorption layer having black characteristic on upper and lower surfaces and a partition wall of the metal wire.

The present invention is also to provide a method of manufacturing a transparent electrode having reduced light reflectance of a metal wire by using a printing process.

The present invention is also to provide a transparent electrode based on a mesh structure having high conductivity and high transmittance.

The present invention is also to provide a transparent electrode based on a mesh structure having high conductivity and transmittance while preventing natural light from being reflected on a conductive wire and improving the visibility. The present invention is also to provide a method of manufacturing a transparent electrode in which a conductive wire having a high aspect ratio and a fine line width is formed in a mesh structure by using an imprinting process.

The present invention is to provide a method of manufacturing a transparent electrode based on a mesh structure capable of improving the visibility by forming a light absorbing layer having a form of a thin film on upper and lower surfaces and a partition wall of a conductive wire having a high aspect ratio and a fine line width.

Technical Solution

According to a first aspect of the present invention, there is provided a transparent electrode based on a metal material including: a transparent substrate; a metal wire that is made of a metal material and is formed on the transparent substrate; and a light absorbing layer that is made of a photoreactive material, has black characteristic, and is formed on all or a portion of a surface of the metal wire, wherein light reflectance due to the metal wire is reduced.

In the transparent electrode based on a metal material according to the first aspect, it is preferable that the metal wire is made of one of a conductive ink based on metal nanoparticles and a metal nanowire dispersion solution, and the light absorbing layer is formed on a lower surface of the metal wire or formed on an upper surface, a lower surface, and a partition wall of the metal wire.

In the transparent electrode based on a metal material according to the first aspect, it is preferable that the metal wire is formed in a metal mesh structure based on metal nanoparticles, and the light absorbing layer is formed on a lower surface and a partition wall of the metal wire or formed on a lower surface, an upper surface and a partition wall of the metal wire.

In the transparent electrode based on a metal material according to the first aspect, it is preferable that, the light absorbing layer is made of a mixed solution of a polymer material capable of being subjected to a solution process and having a photoreactive property and a dye or a pigment having black characteristic.

According to a second aspect of the present invention, there is provided a method of manufacturing a transparent electrode based on a metal material, including steps of: (a) applying a material having black characteristic to a transparent substrate to form a buffer layer; (b) imprinting a stamp having a predetermined mesh pattern on the buffer layer and performing thermal treatment to form a mesh pattern on the buffer layer; (c) implanting a conductive solution for wire into the mesh pattern of the buffer layer to form a metal wire having a mesh structure; (d) performing a primary thermal sintering process to remove a solvent of the conductive solution for wire and induce solidification; (e) performing UV light irradiation on the buffer layer by using the metal wire as a mask; and (f) forming a light absorption layer on a partition wall and a lower surface of the metal wire by etching the buffer layer self-masked by the metal wire and irradiated with light.

In the method of manufacturing a transparent electrode according to the second aspect, it is preferable that, the method further includes a step of forming an additional buffer layer on an upper surface of the metal wire having a mesh structure after the step (c), wherein the step (f) includes forming the light absorption layer on the upper surface, the lower surface, and the partition wall of the metal wire.

According to a third aspect of the present invention, there is provided a method of manufacturing a transparent electrode based on a metal material, including steps of: (a) forming a buffer layer by applying a material having black characteristic to a transparent substrate and performing thermal treatment; (b) applying a metal nanowire dispersion solution to a surface of the buffer layer to form a metal nanowire layer; (c) performing a primary thermal sintering process to adhere the metal nanowire layer to the buffer layer; (d) performing UV light irradiation on the buffer layer by using the metal nanowire layer as a mask; and (e) etching the buffer layer self-masked by the metal nanowire layer to form a light absorbing layer on lower surfaces of the metal nanowires.

In the method of manufacturing the transparent electrode according to the third aspect, it is preferable that, the method further includes a step of forming an additional buffer layer by applying a material having black characteristic to an upper surface of the metal nanowire layer after step (b), wherein the step (e) includes forming the light absorbing layer on lower surfaces, upper surfaces, and partition walls of the metal nanowires.

In the transparent electrode manufacturing method according to the second and third aspects, it is preferable that the buffer layer is made of a mixed solution of a polymer material capable of being subjected to a solution process and having a photoreactive property and a dye or a pigment having black characteristic.

In the transparent electrode manufacturing method according to the second and third aspects, it is preferable that a thermal sintering temperature in the step of performing the primary thermal sintering process is a temperature at which the buffer layer can maintain a state in which thermal denaturation can occur by UV light irradiation, a solvent of the metal wire can be removed, and solidification can be induced.

In the method of manufacturing the transparent electrode according to the second aspect, it is preferable that a thermal treatment temperature in the step of performing the primary thermal sintering process is a temperature at which a cross-linking agent of the conductive solution for wire and the buffer layer adjacent to the metal wire are adsorbed to each other and the buffer layer can maintain a state in which thermal denaturation can occur by the UV light irradiation.

According to a fourth aspect of the present invention, there is provided a transparent electrode based on a mesh structure including: a transparent substrate; a conductive wire that is made of a material having electrical conductivity and is formed in a mesh structure on the transparent substrate; a light absorbing layer that is made of a material capable of being subjected to chemical wet etching and has black characteristic, and is formed on all or a portion of a surface of the conductive wire, wherein light reflectance due to the conductive wire is reduced.

In the transparent electrode based on the mesh structure according to the fourth aspect, it is preferable that the conductive wire is made of one of a conductive ink based on metal nanoparticles and a carbon nanotube having electrical conductivity.

In the transparent electrode based on the mesh structure according to the fourth aspect, it is preferable that the light absorbing layer is made of a mixed solution of a polymer material capable of being subjected to a solution process and capable of being subjected to chemical solution etching and a dye or a pigment having black characteristic.

According to a fifth aspect of the present invention, there is provided a method of manufacturing a transparent electrode based on a mesh structure, including steps of: (a) forming a buffer layer for imprinting on a transparent substrate; (b) imprinting a stamp having a predetermined mesh pattern on the buffer layer to form a mesh pattern on the buffer layer; (c) implanting a conductive solution for wire into the mesh pattern of the buffer layer; (d) performing a primary thermal sintering process to remove a solvent of the conductive solution for wire and induce solidification to form a conductive wire having a mesh structure; and (e) forming alight absorption layer having a form of a thin film on a partition wall and a lower surface of the conductive wire by etching the buffer layer.

In the method of manufacturing the transparent electrode according to the fifth aspect, it is preferable that the method further includes a step of forming an additional buffer layer on an upper surface of the conductive wire having a mesh structure after the step (c), wherein the step (e) includes forming the light absorption layer having a form of a thin film on the upper surface, the lower surface, and the partition wall of the conductive wire.

In the method of manufacturing the transparent electrode according to the fifth aspect, it is preferable that the method the buffer layer is made of a mixed solution of a polymer material capable of being subjected to a solution process and capable of being subjected to chemical wet etching and a dye or a pigment having black characteristic.

In the method of manufacturing the transparent electrode according to the fifth aspect, it is preferable that a thermal treatment temperature in the step of performing the primary thermal sintering process is a temperature at which the buffer layer is not completely thermally denatured and the buffer layer in a region adjacent to the conductive wire is locally thermally denatured due to thermal conduction of the conductive wire.

In the method of manufacturing the transparent electrode according to the fifth aspect, it is preferable that the conductive solution for wire is made of a nano-sized material capable of being subjected to a printing process and capable of being implanted into a mesh pattern and having electrical conductivity, and the conductive solution for wire is made of one of a conductive ink based on metal nanoparticles and a carbon nanotube.

In the transparent electrode manufacturing method according to the fifth aspect, it is preferable that a height and a width of the mesh pattern formed on the stamp are determined according to a line width and an aspect ratio required for the conductive wire.

In the method of manufacturing the transparent electrode according to the fifth aspect, it is preferable that the method further include a step of performing a secondary thermal sintering process after the light absorbing layer is formed on a surface of the conductive wire by etching the buffer layer, to improve conductivity of the conductive wire.

In the method of manufacturing the transparent electrode according to the fifth aspect, it is preferable that a thermal treatment temperature in the step of performing the secondary thermal sintering process is a temperature equal to or lower than a melting temperature of a material constituting the buffer layer.

Advantageous Effects

In a structure of a transparent electrode based on a metal material according to the present invention, a light absorbing layer having a form of a thin film is formed in the periphery of a metal wire, and thus, natural light is prevented from being reflected on a partition wall or upper and lower surfaces without reducing transmittance of the transparent electrode, so that it is possible to improve the visibility of the display.

In addition, in a method of manufacturing a transparent electrode based on a metal material according to the present invention, a metal wire based on a mesh structure is selectively formed on an upper portion of a buffer layer made of a photoreactive black material, and the metal wire functions as a mask for UV light in etching of a buffer layer, and thus, self-masking is implemented, so that it is possible to form a light absorbing layer having a form of a thin film on upper and lower surfaces and a partition wall of the metal wire having a fine line width.

In addition, in a method of manufacturing a transparent electrode based on a metal material according to the present invention, since an additional process for alignment is not provided, self-masking for UV light irradiation is realized by a metal wire, so that an expensive processing system for a photolithography process and fine alignment is not required, and it is possible to form a light absorbing layer self-aligned on a lower portion of r the metal wire through simple UV irradiation and etching processes.

In a structure of the transparent electrode based on a mesh structure according to the present invention, a thin light absorbing layer is formed in the periphery of the conductive wire, and thus, reflection of natural light from a conductive wire can be reduced without deceasing transmittance of the transparent electrode, so that it is possible to improve the visibility.

In addition, in a method of manufacturing a transparent electrode based on a mesh structure according to the present invention, after imprinting a mesh pattern on a buffer layer, a conductive solution for wire is selectively implanted into the mesh pattern formed on the buffer layer, and after forming a conductive wire and performing a primary thermal sintering process, the buffer layer is wet-etched, so that it is possible to form the conductive wire having a fine line width and a high aspect ratio. As a result, due to the mesh structure, it is possible to provide the transparent electrode having excellent transmittance and electrical conductivity.

In addition, in a method of manufacturing a transparent electrode based on a mesh structure according to the present invention, a material having black characteristic is used as a buffer layer for an imprinting process, so that it is possible to form a thin light absorbing layer on upper/lower surfaces and a partition wall of a conductive wire by using the buffer layer. In the transparent electrode according to the present invention, the thin light absorbing layer on the surface of the conductive wire, and thus, natural light is prevented from being reflected on the conductive wire, so that it is possible to improve the visibility of the display.

In addition, in a method of manufacturing a transparent electrode based on a mesh structure according to the present invention, only the region of a buffer layer adjacent to a conductive wire is thermally denatured by thermal conduction of the conductive wire due to a primary thermal sintering process, and after that, the buffer layer is etched, so that it is possible to form a thin light absorbing layer on the lower surface and the partition wall of the conductive wire without an additional alignment process.

BEST MODE

In a transparent electrode based on a metal material having reduced light reflectance according to the present invention, a light absorbing layer having black characteristic is formed on a lower surface, a partition wall, and/or an upper surface of the metal wire, and thus, the light reflectance at the transparent electrode is minimized, so that the visibility of the screen of the display is improved. In addition, in a method of manufacturing a transparent electrode according to the present invention, a light absorbing layer can be selectively formed on upper and lower surfaces and a partition wall of a metal wire having a fine line width by using self-aligning and a spontaneous pattern effect.

Hereinafter, various embodiments according to the present invention will be described in detail with reference to the accompanying drawings.

[First Embodiment]

A transparent electrode according to a first embodiment of the present invention and a method of manufacturing the same will be described in detail. In the transparent electrode according to this embodiment, a light absorbing layer having a form of a thin film is formed on the lower surface and the partition wall of a metal wire having a mesh structure.

Figure 1:
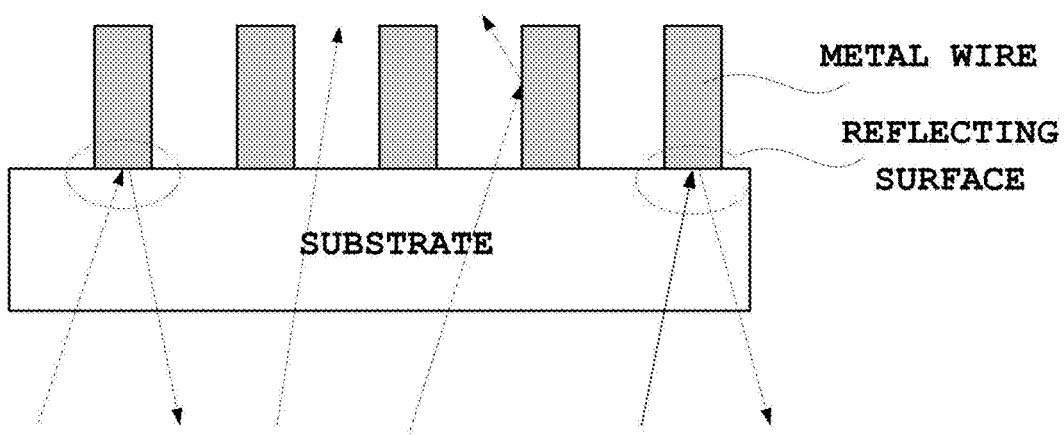
FIG. 1 is a cross-sectional diagram conceptually illustrating that natural light is reflected on a front surface, a side surface, or the like of a metal wire in a transparent electrode in which a metal wire is formed in a mesh structure in the related art.
Figure 2A:
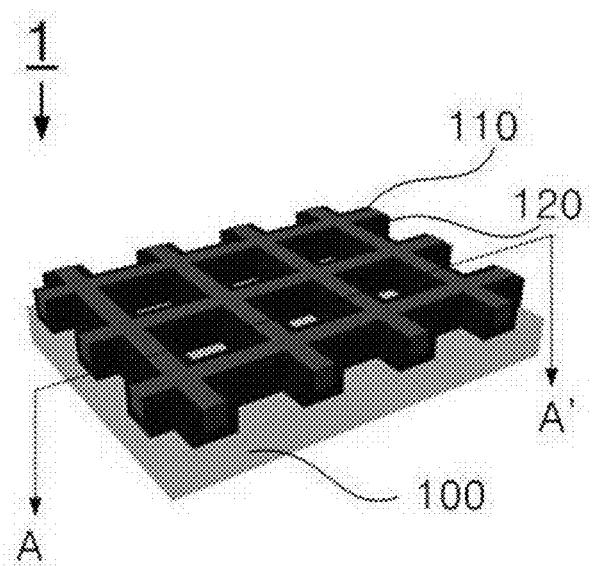
FIGS. 2A and 2B are a perspective diagram and a cross-sectional diagram illustrating a transparent electrode according to a first embodiment of the present invention.
Figure 2B:
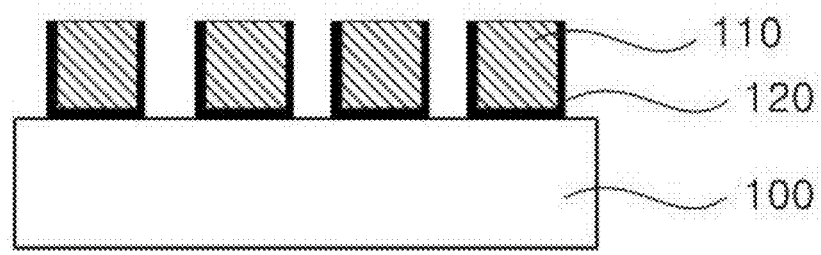

FIGS. 2A and 2B are a perspective diagram and a cross-sectional diagram illustrating a transparent electrode according to the first embodiment of the present invention. Referring to FIGS. 2A and 2B, the transparent electrode 1 according to this embodiment is configured to include a substrate 100, a metal wire 110 having a mesh structure, and a light absorption layer 120 formed on a lower surface and the partition wall of the metal wire.

It is preferable that the substrate 100 is a substantially flat substrate made of a material having excellent heat resistance and a transparent property. As an example of the substrate, a glass substrate or the like may be used. In particular, the substrate is required to have heat resistance to such an extent that deformation does not occur at a thermal treatment temperature used in a process for forming the metal wire having a mesh structure and the light absorption layer.

The metal wire 110 is configured to have substantially a mesh structure and is made of a conductive material which can be produced by a printing process and has a nano size capable of being implanted into a mesh pattern. As the conductive material for wire usable as the metal wire, there may be exemplified conductive inks based on metal nanoparticles. As the metal nanoparticles, there may be exemplified metal nanoparticles of Ag, Ni, Cu, or the like. In the conductive ink, the metal nanoparticles are dispersed in a solvent, and a cross-linking agent for bonding with a substrate or the like is contained.

The light absorbing layer 120 is made of a photoreactive material having black characteristic and is made of a material in which dye or pigment having black characteristic is mixed with a dissolved polymer material.

The polymer material constituting the light absorbing layer is required to be a polymer material that is capable of being subjected to a solution process, can react during UV light irradiation, and can be selectively wet etched. As the polymer material that is capable of being subjected to a solution process, a positive photoresist material may be used, or a material in which a UV photoreactive material is mixed with a polymer material capable of being wet etched may be used. As the polymer material capable of being wet etched, there may be exemplified polyimide (PI), polymethylmethacrylate (PMMA), polyhydroxybutyrate (PHB), and the like. As the UV photoreactive material, there may be exemplified benzophenone and the like. As the dye or pigment having black characteristic constituting the light absorbing layer, carbon black, amido black, 1,5-bis-(4-butylphenylamino)-anthraquinone, or the like may be selectively used.

Therefore, as an example of the material constituting the light absorbing layer, a solution in which carbon black is mixed with the positive photoresist may be used.

On the other hand, in the transparent electrode, the transmittance thereof should not be reduced by the light absorbing layer having black characteristic. Therefore, in order to prevent the reduction in transmittance of the transparent electrode due to the formation of the light absorbing layer, the light absorbing layer and the metal wire is required to be accurately aligned, and the light absorbing layer is required to be formed on the partition wall and the like of the metal wire with such thickness that the light absorbing layer does not affect the transmittance of the transparent electrode while absorbing natural light.

Figure 3:
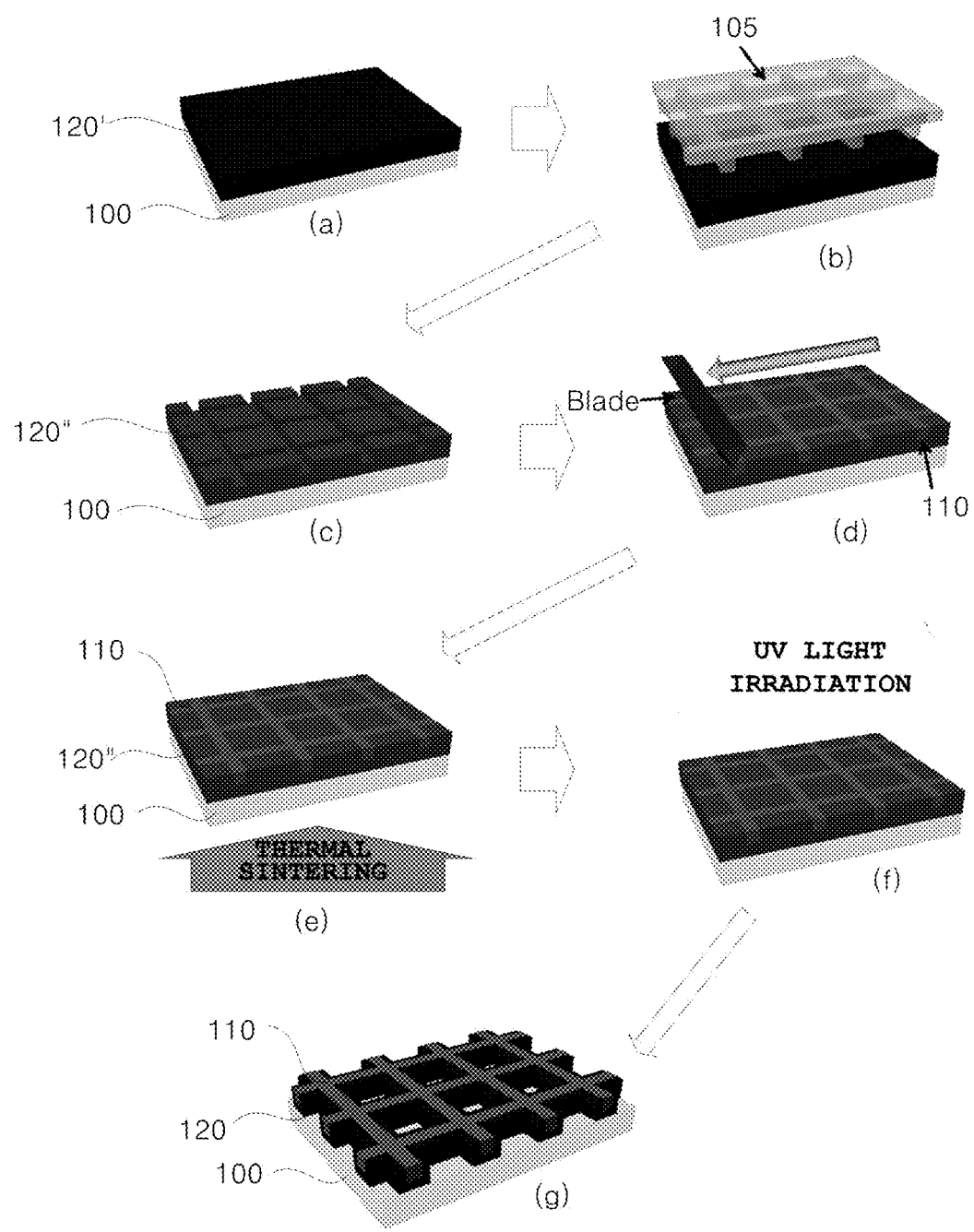
FIG. 3 is schematic diagrams sequentially illustrating processes of a method of manufacturing the transparent electrode according to the first embodiment of the present invention.

Hereinafter, the method of manufacturing the transparent electrode according to this embodiment will be described in detail with reference to FIG. 3. FIG. 3 is a schematic diagram sequentially illustrating processes of the method of manufacturing the transparent electrode according to the first embodiment of the present invention.

Referring to FIG. 3, first, a photoreactive material having black characteristic for forming a light absorption layer 120 is applied to a substrate 100 to form a buffer layer 120' (a). The substrate 100 and the photoreactive material having black characteristic are the same as those described in the transparent electrode. The buffer layer 120' is allowed to constitute the light absorption layer 120 having a form of a thin film through the subsequent processes described below.

Next, imprinting is performed by using an elastic stamp 105 having a mesh pattern formed on the buffer layer 120', and at the same time, thermal treatment is performed, so that a mesh pattern is formed on the buffer layer 120' (b). The thermal treatment is performed for removing a solvent of the buffer layer and inducing solidification. Therefore, with respect to the temperature condition, the temperature of the thermal treatment is required to be lower than the temperature of soft baking of the photoresist. Since the solvent of the buffer layer needs to be removed, an appropriate temperature is about 80° C. As a result, a buffer layer 120" having a mesh pattern formed on the substrate 100 is completed (c). The elastic stamp may be made of a polymer material having elasticity. For example, polydimethylsiloxane (PDMS), polyurethane acrylate (PUA), or the like may be used. Furthermore, the pattern structure formed on the elastic stamp is a mesh type. It is preferable that the width and height of the pattern may be freely controlled. In the elastic stamp for constituting the metal wire according to the present invention, the line width of the metal wire is 1, 2, 3, or 4 μm, and the interval between the wire lines is a sum of a gap and a line width of the wire, which may be fixed as 202 μm. Furthermore, the thickness of the wire may be 0.5, 1, 1.5, and 2 μm.

Next, a metal wire 110 is formed by implanting a conductive solution for wire into the mesh pattern 105 of the buffer layer 120" (d). The conductive solution for wire is capable of being subjected to a printing process and is made of nano-sized particles, which can be implanted into the formed mesh pattern on the buffer layer and is made of an electrically conductive material. As the conductive solution for wire, a conductive ink or the like based on metal nanoparticles may be used. As the conductive ink, an ink in which metal nanoparticles of Ag, Ni, Cu, or the like are dispersed may be used. On the other hand, in order to implant the conductive solution for wire into the mesh pattern, a blade method may be applied.

Next, a primary thermal sintering process is performed (e). The primary thermal sintering is performed in order to adsorb the conductive solution for wire to the substrate or the buffer layer, to remove the solvent of the conductive solution for wire, and to induce solidification. Therefore, the primary thermal sintering temperature is required to be equal to or higher than such a temperature that can induce the cross-linking agent (binder) material of the conductive solution for wire to be adsorbed to the buffer layer or to be such a temperature at which the solvent for the conductive solution for wire can be removed. In the case where photoresist is used as the buffer layer, the primary thermal sintering process may be performed at a soft baking temperature, and the temperature may be in a range of about 110° C. to 130° C.

On the other hand, with respect to the buffer layer, for photolysis induction and etching processes to be performed after the primary thermal sintering, the primary thermal sintering temperature is required to be lower than such a temperature at which the complete binding of the materials constituting the buffer layer is induced. For example, in the case where the buffer layer is made of photoresist, the primary thermal sintering temperature is preferably a soft baking temperature for the solvent removal and solidification of the implanted conductive solution for wire in order to prevent the wire from being affected by the subsequent etching process. In particular, the primary thermal sintering temperature is required to be lower than a hard baking temperature in which the complete binding of the photoresist is induced.

During the primary thermal sintering process, due to high thermal conductivity of the metal material constituting the metal wire, high temperature thermal treatment is locally performed in the peripheral region adjacent to the metal wire. As a result, the buffer layer located in the peripheral region of the wire is thermally denatured by the localized high temperature thermal treatment, and thus, a strong bonding force is formed. Therefore, even in the case where the UV light irradiation is performed, photolysis does not occur, and the buffer layer remains without being removed by an etching process. Furthermore, during the primary thermal sintering process, the cross-linking agent contained in the conductive solution for wire constituting the metal wire and the buffer layer located in the peripheral region of the wire are adsorbed to each other. Therefore, after the light irradiation, even in the case where the etching process is performed, such a thin buffer layer remains in the peripheral region of the wire, so that the light absorption layer having a formed of a thin film is formed.

Next, by using the metal wire as a mask, the buffer layer 120" is irradiated with light in the UV band to induce photolysis of the buffer layer 120" (f). At this time, the metal wire made of the conductive solution for wire implanted into the mesh pattern functions as a mask, so that the region of the buffer layer which is not exposed by the metal wire is not photolyzed, and the exposed region is photolyzed. Namely, by light irradiation using the metal wire as a mask, a light absorption layer self-aligned with the metal wire can be formed on the lower surface of the metal wire.

Next, the photolyzed buffer layer is wet-etched (g). At this time, since the buffer layer located on the lower portion and the partition wall of the metal wire is not photolyzed, the buffer layer remains on the lower portion and the partition wall of the metal wire 110 without being etched by the etching process, so that the light absorption layer 120 having a form of a thin film is formed.

Next, in order to improve the conductivity of the transparent electrode, a second thermal sintering process is performed (h). "Sintering" denotes the phenomenon that, in the case where strong external energy is exerted to powder, the powder is solidified by bonding between particles. In the case where a conductive ink is made of metal nanoparticles, when the sintering process is performed, the metal nanoparticles are bonded to each other, and thus, the particle size becomes larger, so that ideally voids do not exist. In addition, in order to improve dispersion stability, the coated material is disintegrated to disappear on the surface of the particles, and thus, the conductivity can be maximized. The secondary thermal sintering process is preferably performed at a temperature of about 180° C. to 200° C. since the temperature is a temperature at which the transparent electrode material can be sintered and is a temperature equal to or lower than the melting temperature of the material constituting the buffer layer.

Hereinafter, a portion of processes used in the method of manufacturing the transparent electrode according to the present invention will be described in more detail with reference to FIGS. 4A, 4B, 5A, 5B, 6A, 6B,6C and 6D.

Figure 4A:
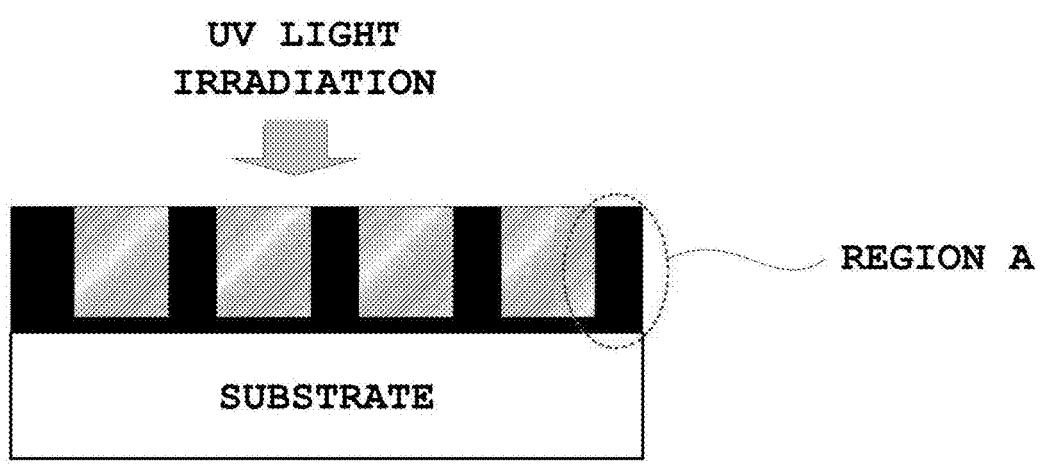
FIGS. 4A and 4B are conceptual diagrams illustrating a process in which a light absorbing layer is formed in a self-aligned manner on a metal wire during UV light irradiation in the method of manufacturing the transparent electrode according to the present invention.
Figure 4B:
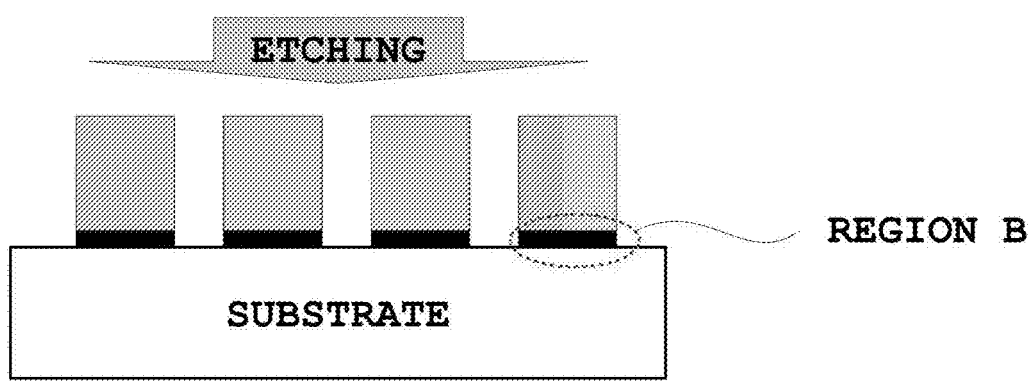

FIGS. 4A and 4B are conceptual views illustrating a process in which the light absorbing layer is formed by being self-aligned on the metal wire during the UV light irradiation in the method of manufacturing the transparent electrode according to the present invention. Referring to FIGS. 4A and 4B, in the case where the UV light irradiation is performed on the buffer layer on which the metal wire is formed, only the buffer layer (the region A in FIG. 4A) in the region where there is no metal wire is exposed to UV light to be photolyzed. The photolyzed buffer layer is selectively etched by UV light, so that only the buffer layer (the region B in FIG. 4B) remains on the lower surface of the metal wire.

Figure 5A:
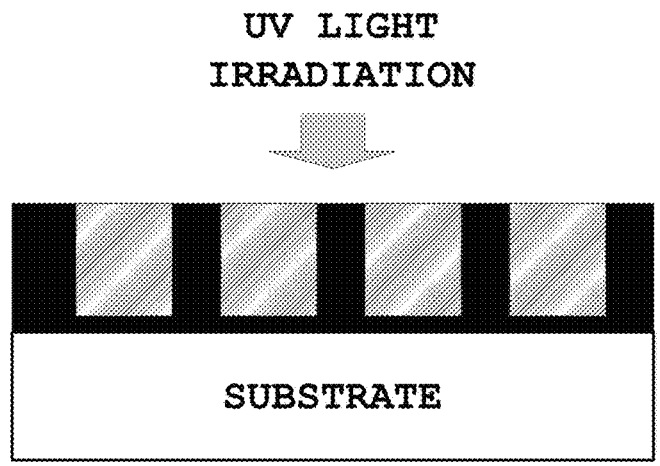
FIGS. 5A and 5B are conceptual diagrams illustrating that, in a method of manufacturing a transparent electrode according to the present invention, photoreaction to UV light irradiation is not induced due to an increase in a bonding force of a buffer layer in a peripheral region of a wire, and thus, after an etching process on the buffer layer, the peripheral region of the wire remains without being etched, so that a light absorbing layer having a form of a thin film is formed.
Figure 5B:
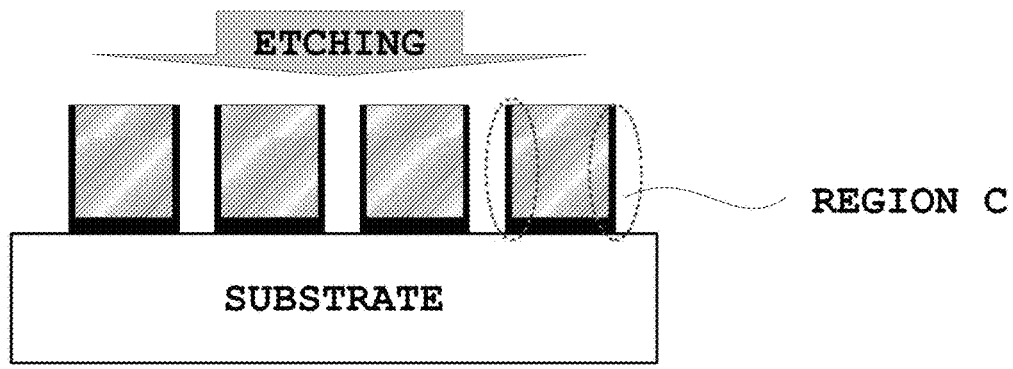
Figure 6A:
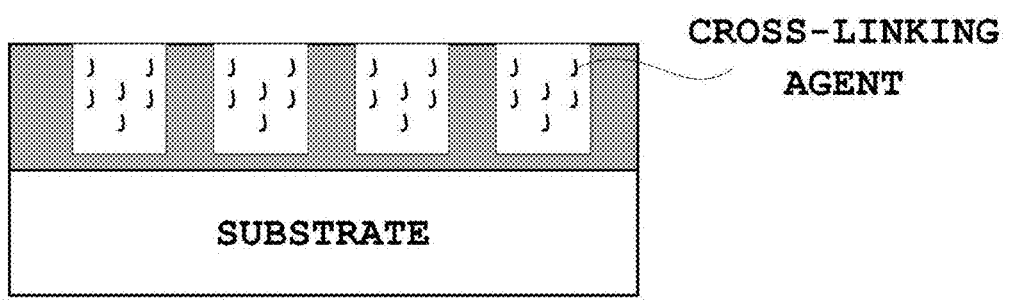
FIGS. 6A to 6D are conceptual diagrams illustrating that, in the method of manufacturing the transparent electrode according to the present invention, as the cross-linking agent and the constituent materials of the buffer layer are adsorbed to each other during the primary thermal sintering process, the adsorbed region remains without being etched during the etching process.
Figure 6B:
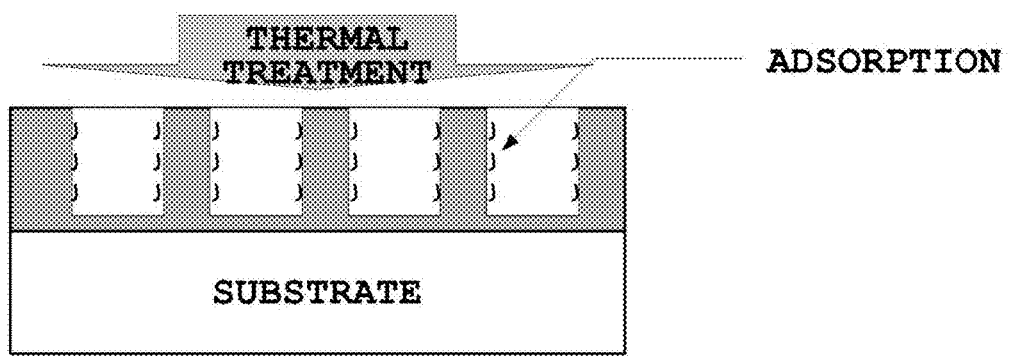
Figure 6C:
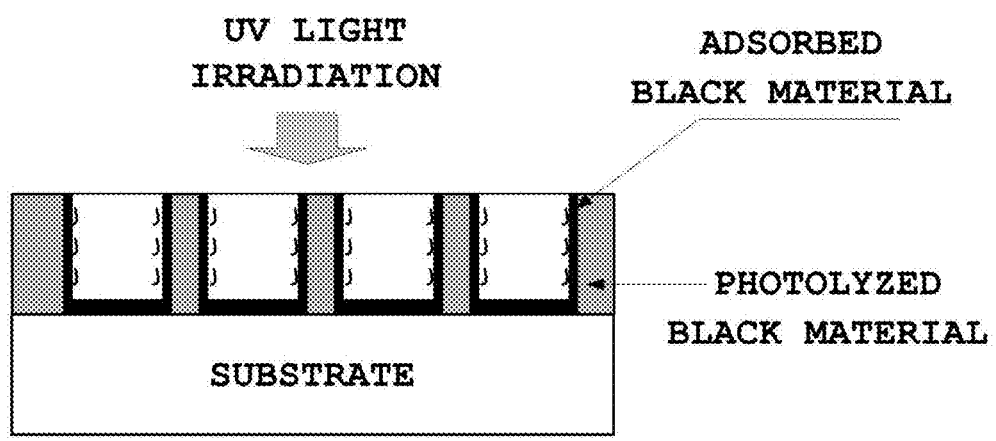
Figure 6D:
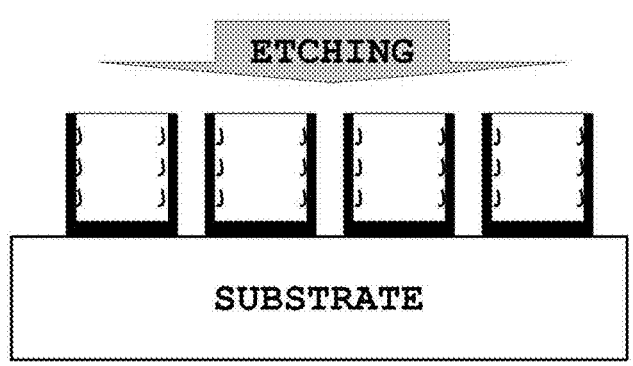

Furthermore, during the primary thermal sintering, the thermal treatment is locally performed at a high temperature in the buffer layer adjacent to the metal wire due to excellent thermal conductivity of the metal material. As a result, localized thermal denaturation occurs in the buffer layer in the peripheral region of the metal wire, so that the bonding force is improved. FIGS. 5A and 5B are conceptual diagrams illustrating the improved bonding force of the buffer layer in the peripheral region of the wire in the method of manufacturing the transparent electrode according to the present invention. Referring to FIG. 5A, during the primary thermal sintering process, the buffer layer in the periphery of the wire is locally thermally denatured due to the high temperature thermal treatment in which the buffer layer in the periphery of the wire is generated locally, and photolysis is not induced during the UV light irradiation due to the improvement of the bonding force. As a result, as illustrated in FIG. 5B, in the process of selectively etching the buffer layer, the buffer layer (the region C in FIG. 5B) located on the partition wall of the metal wire with improved bonding force remains without being etched, so that the light absorbing layer having a form of a thin film is formed.

Furthermore, during the primary thermal sintering, the cross-linking agent of the conductive solution for wire constituting the metal wire and the constituent material of the buffer layer are adsorbed to each other. FIGS. 6A to 6D are conceptual diagrams illustrating that, in the method of manufacturing the transparent electrode according to the present invention, as the cross-linking agent and the constituent materials of the buffer layer are adsorbed to each other during the primary thermal sintering process, the adsorbed region remains without being etched during the etching process. Referring to FIGS. 6A to 6D, as the cross-linking agent of the metal wire and the constituent materials of the buffer layer in the peripheral region of the wire are adsorbed to each other during the primary thermal sintering, even in the case where, after the light irradiation, the selective etching process is performed, the buffer layer located on the partition wall of the wire remains without being etched, so that the light absorbing layer having a form of a thin film is formed.

[Second Embodiment]

In a structure of a transparent electrode having low light reflectance according to a second embodiment of the present invention, a light absorbing layer is formed on an upper surface, a lower surface, and a partition wall of a metal wire.

Figure 7A:
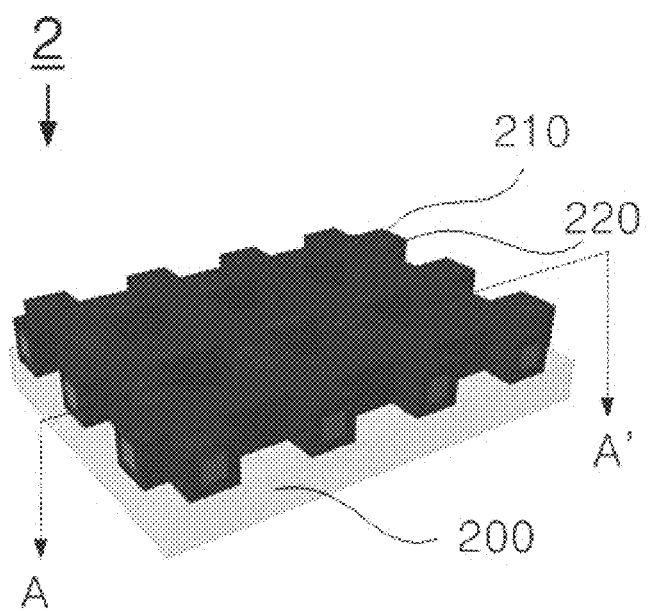
FIGS. 7A and 7B are a perspective diagram and a sectional diagram illustrating a structure of a transparent electrode having low light reflectance according to a second embodiment of the present invention.
Figure 7B:
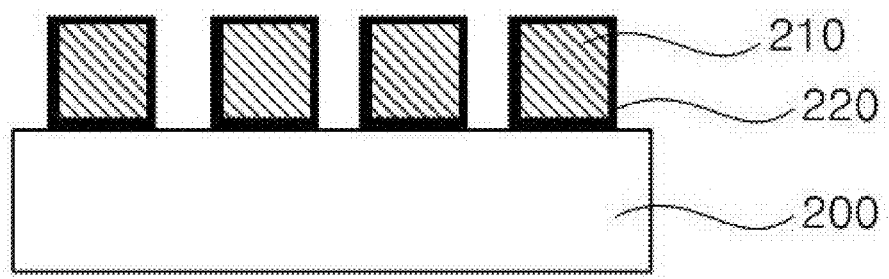

FIGS. 7A and 7B are a perspective diagram and a cross-sectional diagram illustrating a structure of a transparent electrode having low light reflectance according to the second embodiment of the present invention. Referring to FIGS. 7A and 7B, the structure of the transparent electrode 2 according to this embodiment is the same as the structure of the transparent electrode according to the first embodiment except that a light absorbing layer 220 is formed on the upper surface of the metal wire 210 as well as on the lower surface and the partition wall of the metal wire 210.

Figure 8:
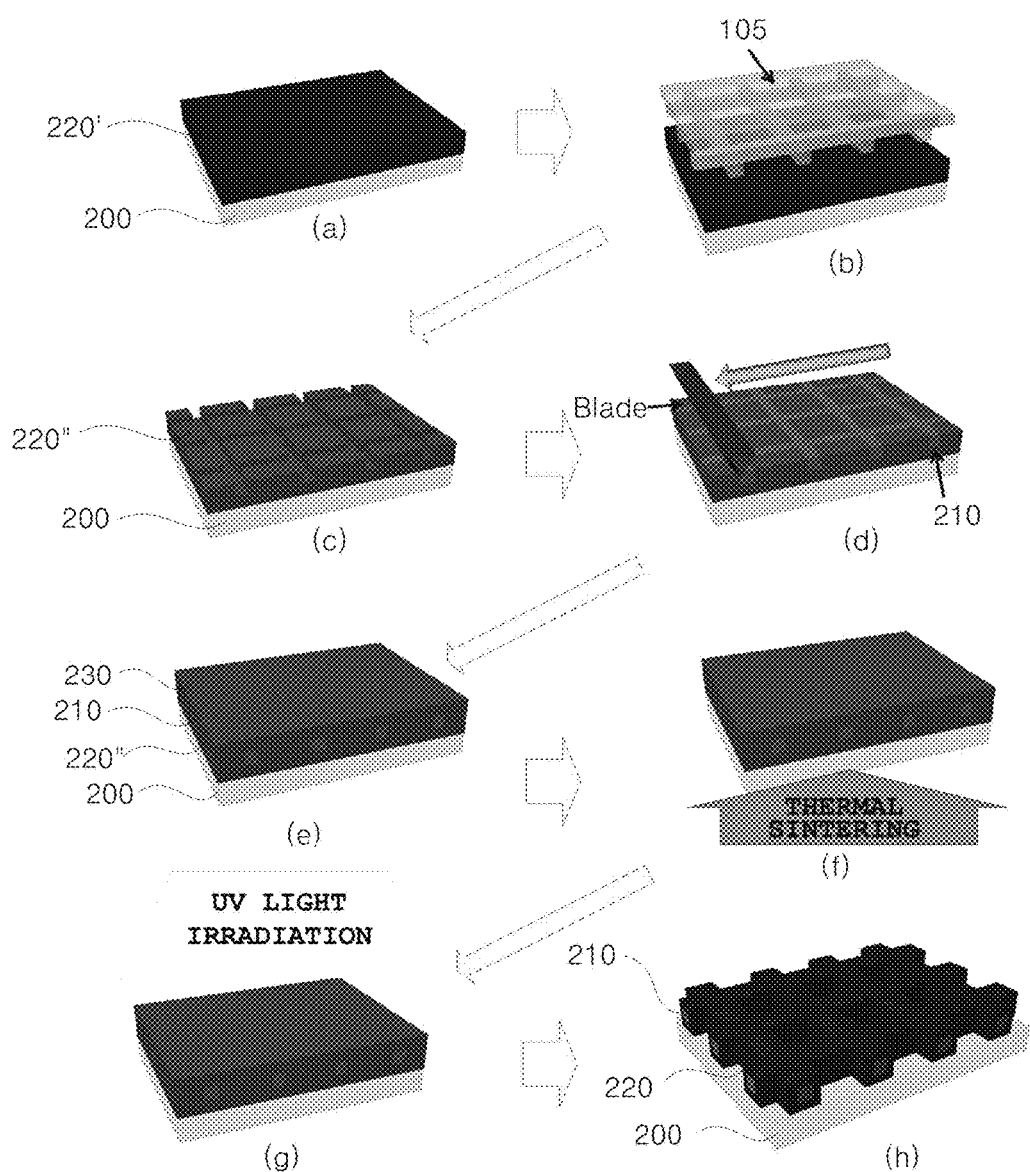
FIG. 8 is a schematic diagram sequentially illustrating processes of a method of manufacturing the structure of the transparent electrode according to the second embodiment of the present invention.

FIG. 8 is a schematic diagram sequentially illustrating processes of a method of manufacturing the structure of the transparent electrode according to the second embodiment of the present invention. Referring to FIG. 8, the processes of manufacturing the transparent electrode according to this embodiment are generally the same as those of the first embodiment except for further including a process of forming an additional buffer layer by implanting the conductive solution for wire into a mesh pattern of the buffer layer 220" to form the metal wire 210, and after that, applying a photoreactive material 230 having black characteristic to the upper portion thereof (step (e) in FIG. 8). Spin coating, bar coating, deep coating, or the like may be used to further coat the photoreactive material having black characteristic on the metal wire.

According to the method of manufacturing the transparent electrode according to this embodiment, the light absorption layer 220 having black characteristic is formed on the upper surface, the lower surface, and the partition wall of the metal wire 210.

[Third Embodiment]

A transparent electrode according to a third embodiment of the present invention and a method of manufacturing the same will be described in detail. In the transparent electrode according to this embodiment, a light absorbing layer having a small thickness is formed on the lower surface of the metal nanowires.

Figure 9A:
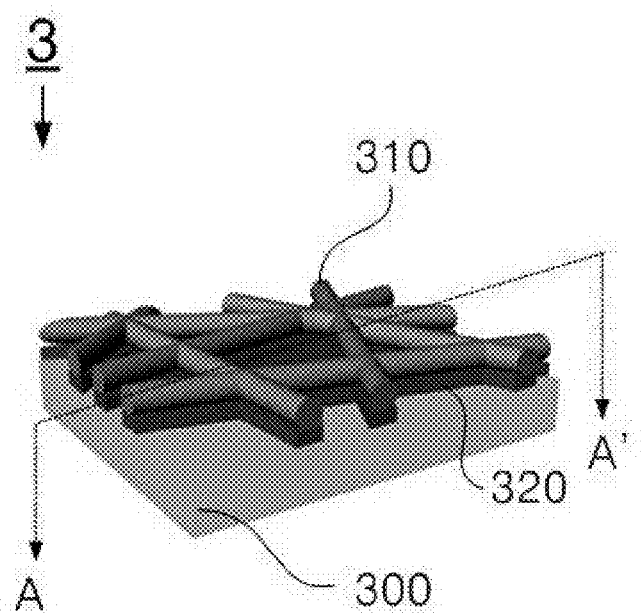
FIGS. 9A and 9B are a perspective diagram and a cross-sectional diagram illustrating a transparent electrode according to a third embodiment of the present invention.
Figure 9B:
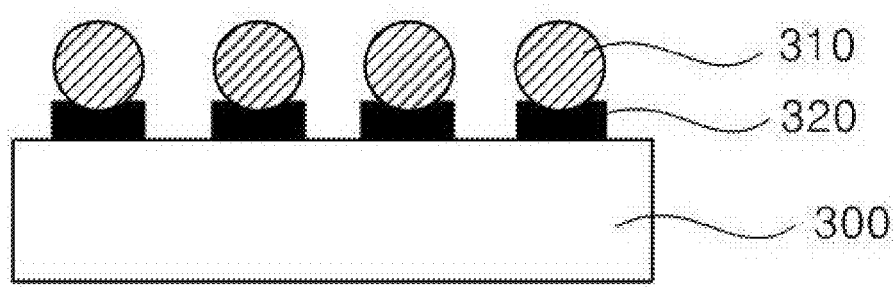

FIGS. 9A and 9B are a perspective diagram and a cross-sectional diagram illustrating the transparent electrode according to the third embodiment of the present invention. Referring to FIGS. 9A and 9B, the transparent electrode 3 according to this embodiment is configured to include a substrate 300, a metal nanowire layer 310 made of metal nanowires, and a light absorbing layer 320 formed on a lower surface of the metal nanowires.

The substrate 300 and the light absorbing layer 320 are the same as those of the transparent electrode of the first embodiment, and redundant description thereof will be omitted.

The metal nanowire layer 310 is formed by applying a metal having excellent electrical conductivity such as Au or Ag to the light absorbing layer in a state of a nanowire structure.

On the other hand, the transparent electrode is required not to have transmittance reduced by the light absorbing layer having black characteristic. Therefore, in order to prevent the reduction in transmittance of the transparent electrode due to the formation of the light absorbing layer, the light absorbing layer and the metal nanowires is required to be accurately aligned. In addition, the light absorbing layer is required to be formed in the periphery of the metal nanowire with such thickness that the light absorbing layer does not affect the transmittance of the transparent electrode while absorbing natural light.

Figure 10:
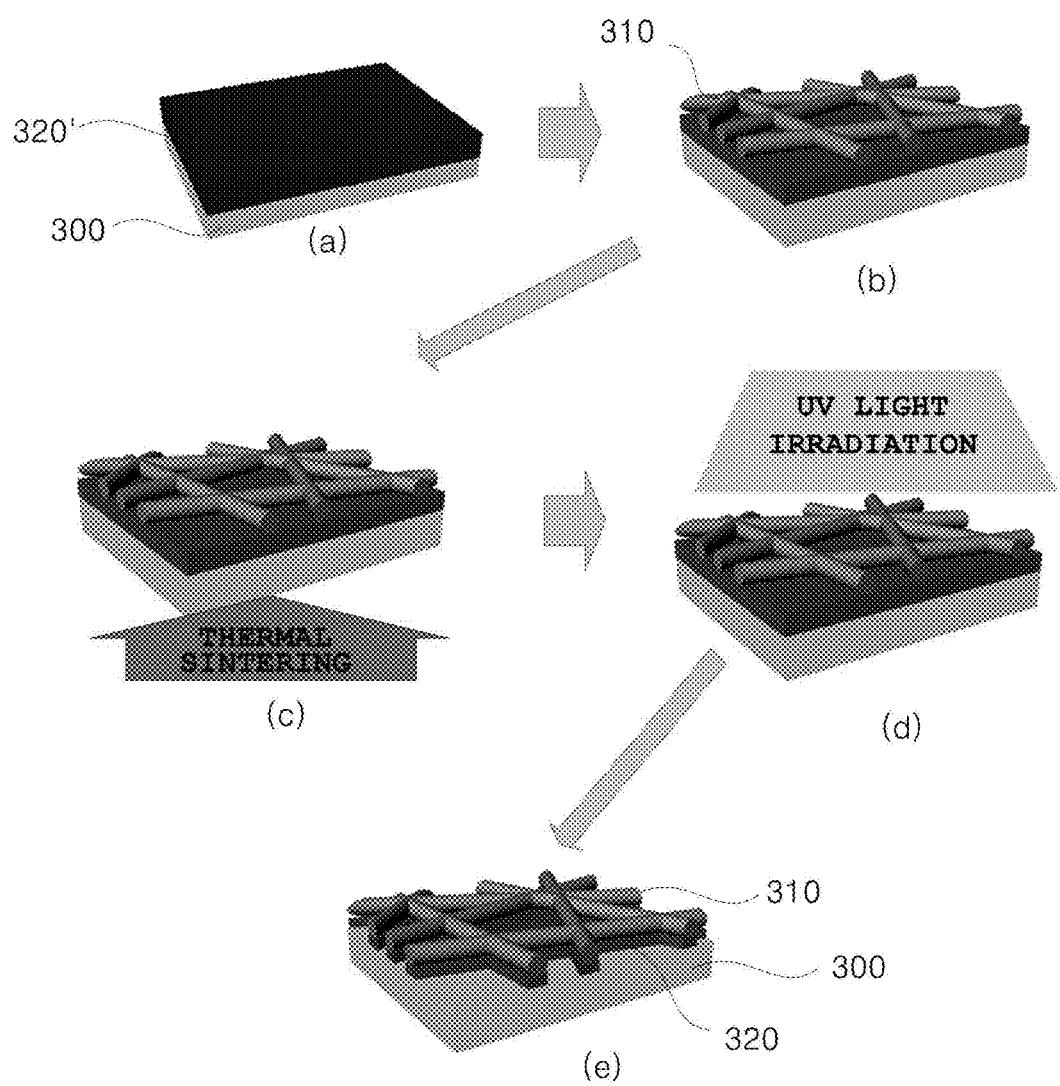
FIG. 10 is a schematic diagram sequentially illustrating processes of a method of manufacturing the transparent electrode according to the third embodiment of the present invention.

Hereinafter, the method of manufacturing the transparent electrode according to this embodiment will be described in detail with reference to FIG. 10. FIG. 10 is a schematic diagram sequentially illustrating processes of the method of manufacturing the transparent electrode according to the third embodiment of the present invention.

Referring to FIG. 10, first, a photoreactive material having black characteristic for forming a light absorption layer 320 is applied to a substrate 300, and after that, thermal treatment is performed to induce solvent removal and solidification of the photoreactive material, so that a buffer layer 320' is formed (a). The substrate 300 and the photoreactive material having black characteristic are the same as those described in the structure of the transparent electrode.

Next, a metal nanowire dispersion solution 310 is applied to buffer layer 320' (b). The metal nanowire dispersion solution is a solution in which metal having excellent electrical conductivity such as Au or Ag is dispersed in a state of nanowires. The metal nanowire dispersion solution can be applied to the buffer layer 320' by using spin coating, bar coating, blade method, or the like.

Next, primary thermal sintering is performed (c). The primary thermal sintering is to adsorb the metal nanowires to the substrate or buffer layer and to remove the solvent of the metal nanowire dispersion solution. Therefore, the primary thermal sintering temperature is required to be such a temperature at which the solvent of the metal nanowire dispersion solution can be removed and the adsorption to the buffer layer is induced.

On the other hand, with respect to the buffer layer, for photolysis induction and etching processes to be performed after the primary thermal sintering, the primary thermal sintering temperature is required to be equal to or lower than such a temperature at which the complete binding of the materials constituting the buffer layer is not induced. For example, in the case where the buffer layer is made of photoresist, the primary thermal sintering temperature is preferably a soft baking temperature for the wet etching process after the light curing of the photoresist. In particular, the primary thermal sintering temperature is required to be lower than a hard baking temperature in which the complete binding of the photoresist is induced.

During the primary thermal sintering process, due to the high thermal conductivity of the metal material constituting the metal nanowire, high temperature thermal treatment is locally performed on the lower surface of the metal nanowire. As a result, the constituent materials of the buffer layer located on the lower surface of the metal nanowire are locally thermally denatured by the localized high temperature thermal treatment, and thus, a strong bonding force is formed. Therefore, even in the case where, after the UV light irradiation, the etching process is performed, the buffer layer of the corresponding region remains without being etched, so that a light absorbing layer having a form of a thin film is formed.

Next, by using the metal nanowires as a mask, the buffer layer is irradiated with light in the UV band to induce photolysis of the buffer layer 120" (d). At this time, during the UV light irradiation on the buffer layer, the metal nanowires function as a mask, so that the region of the buffer layer which is not exposed by the metal nanowires is not photolyzed, and only the exposed region is photolyzed. Namely, by light irradiation using the metal nanowire as a mask, a self-aligned light absorbing layer may be formed on the lower surface of the metal nanowire.

Next, the photolyzed buffer layer is wet-etched (e). At this time, the buffer layer located on the lower surface of the metal nanowire which is not photolyzed by the metal nanowire remains on the lower surface of the metal nanowire 310 without being etched even if the etching process is performed, so that the light absorption layer 320 having a form of a thin film is formed.

Next, in order to improve the conductivity of the transparent electrode, a secondary thermal sintering process is performed. "Sintering" denotes the phenomenon that, in the case where strong external energy is exerted to powder, the powder is solidified by bonding between particles. If the metal nanowires are subjected to the sintering process, a capping layer applied to the wire for dispersing the nanowires is completely removed, and thus, the nanowires are bonded and coupled with each other at the intersections, so that it is possible to maximize the conductivity.

[Fourth Embodiment]

In a structure of a transparent electrode having low light reflectance according to a fourth embodiment of the present invention, a light absorbing layer is formed on an upper surface, a lower surface, and a partition wall of a metal nanowire.

Figure 11A:
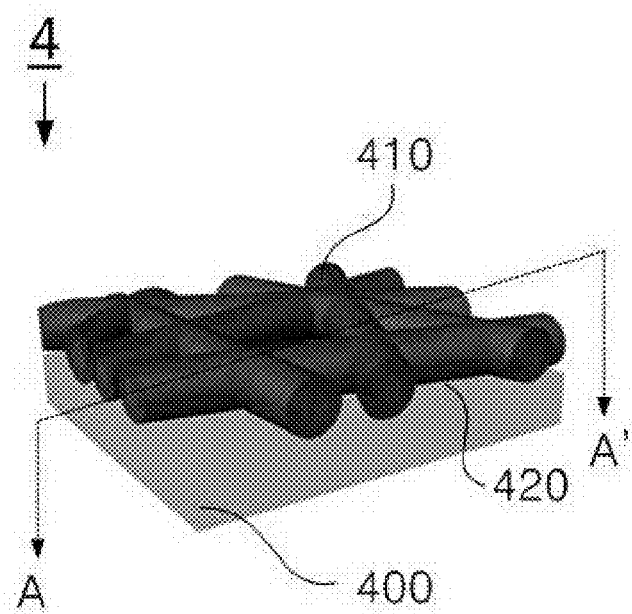
FIGS. 11A and 11B are a perspective diagram and a sectional diagram illustrating a structure of a transparent electrode having low light reflectance according to a fourth embodiment of the present invention.
Figure 11B:
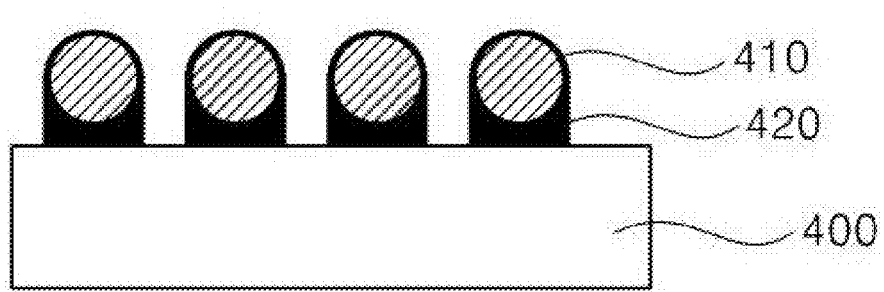

FIGS. 11A and 11B are a perspective diagram and a cross-sectional diagram illustrating the structure of the transparent electrode having low light reflectance according to the fourth embodiment of the present invention. Referring to FIGS. 11A and 11B, the structure of the transparent electrode 4 according to this embodiment is the same as the structure of the transparent electrode according to the third embodiment except that a light absorbing layer 420 is formed on the partition wall and the upper surface of the metal nanowires as well as the lower surface of the metal nanowires constituting a metal nanowire layer 410 in the structure of the transparent electrode of the third embodiment.

Figure 12:
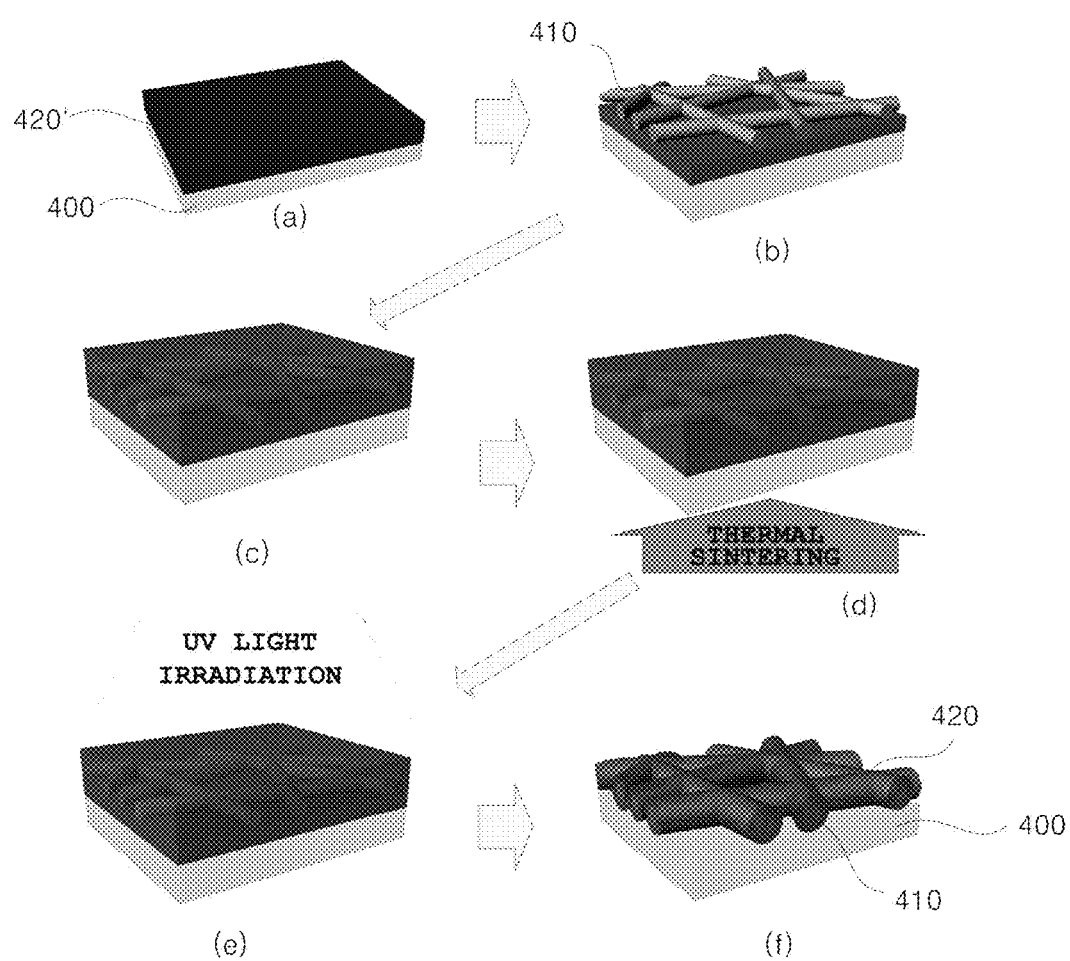
FIG. 12 is a schematic diagram sequentially illustrating processes of a method of manufacturing the structure of the transparent electrode according to the fourth embodiment of the present invention.
Figure 13A:
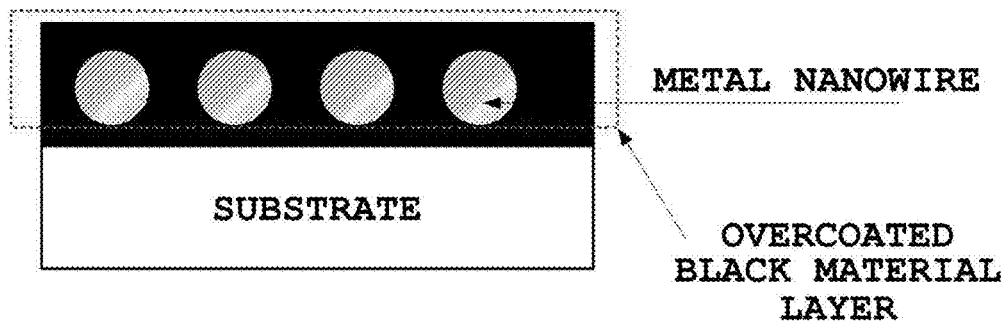
FIGS. 13A to 13D are conceptual diagrams illustrating a process of forming a light absorbing layer on a partition wall and upper and lower surfaces of a metal wire in a method of manufacturing the transparent electrode according to the fourth embodiment of the present invention.
Figure 13B:
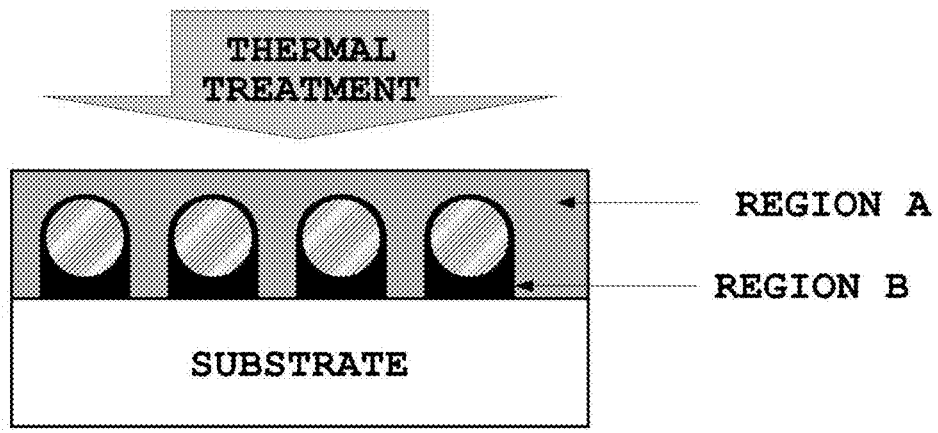
Figure 13C:
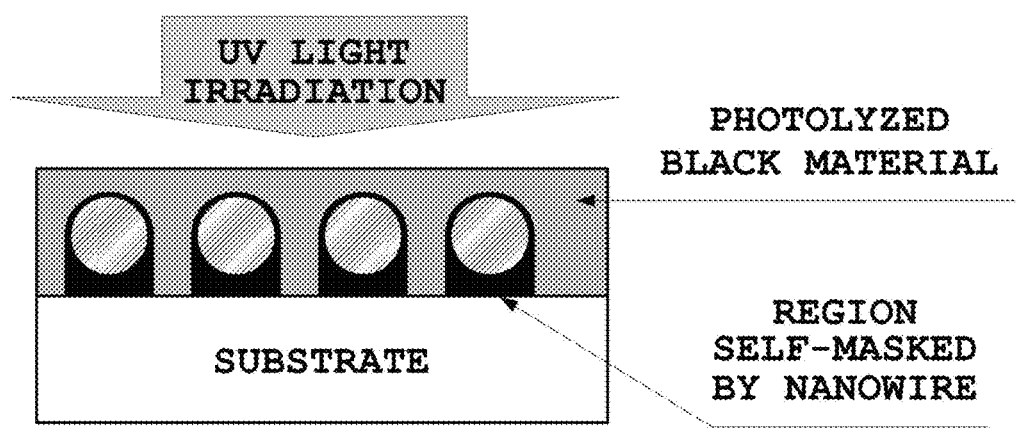
Figure 13D:
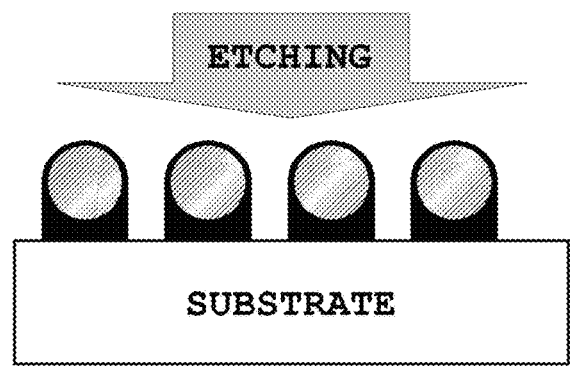

FIG. 12 is a schematic diagram sequentially illustrating processes of a method of manufacturing the structure of the transparent electrode according to the fourth embodiment of the present invention. Referring to FIG. 12, the processes of manufacturing the transparent electrode according to this embodiment is the same as those of the third embodiment except for further including a process of forming an additional buffer layer by applying a metal nanowire dispersion solution to the buffer layer and, after that, applying a photoreactive material having black characteristic to the upper portion thereof (step (c) in FIG. 12). Spin coating, bar coating, deep coating, or the like may be used to further coat the photoreactive material having black characteristic on the metal nanowire layer.

According to the transparent electrode manufacturing method according to this embodiment, the light absorbing layer having black characteristic is formed on the upper surface, the lower surface, and the partition wall of the metal wire made of metal nanowires.

FIGS. 13A to 13D are conceptual views illustrating a process of forming a light absorbing layer on the partition wall and the upper and lower surfaces of the metal wire in the method of manufacturing the transparent electrode according to the fourth embodiment of the present invention. Referring to FIGS. 13A to 13D, the buffer layer is formed entirely on the upper and lower portions of the metal nanowire layer, and after that, the primary thermal sintering process is performed. As a result, due to the high thermal conductivity of the metal nanowires, the buffer layer located in the peripheral region of the metal nanowires is cured with an increase in degree of curing, and the buffer layer in the remaining region is not cured.

The method of manufacturing a transparent electrode based on a mesh structure according to the present invention can realize a fine line width and a high aspect ratio of a conductive wire by forming the conductive wire having a mesh structure by using an imprinting process. As a result, both the transmittance and the electrical conductivity of the transparent electrode can be improved. In addition, in the transparent electrode based on the mesh structure according to the present invention, alight absorption layer having black characteristic is formed on the lower surface, the partition wall and/or the upper surface, and thus, the light reflection of a transparent electrode is minimized, so that the visibility to screen of the display can be improved. In addition, in the method of manufacturing the transparent electrode according to the present invention, self-aligning is used, so that the light absorbing layer can be selectively formed on the upper and lower surface and the partition wall of the conductive wire having a fine line width and a high aspect ratio without an additional aligning process or a photolithography process.

Hereinafter, various embodiments according to the present invention will be described in detail with reference to the accompanying drawings.

[Fifth Embodiment]

A transparent electrode according to a fifth embodiment of the present invention and a method of manufacturing the same will be described in detail. In the transparent electrode according to this embodiment, a light absorbing layer having a form of a thin film is formed on a lower surface and a partition wall of a conductive wire having a mesh structure.

Figure 14A:
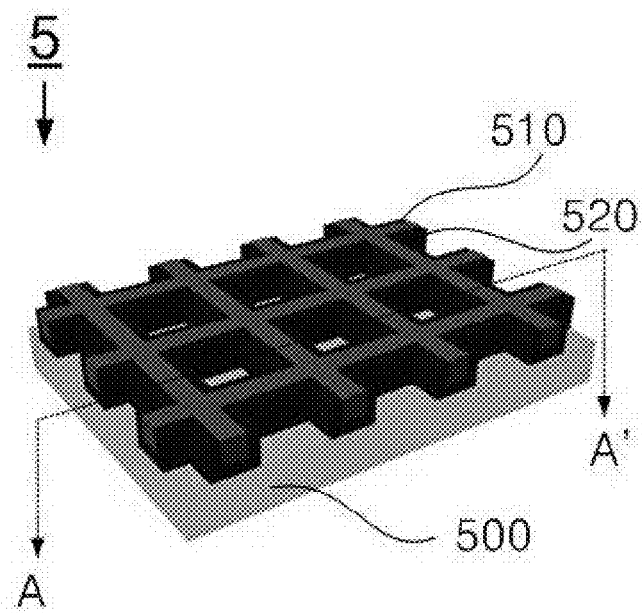
FIGS. 14A and 14B are a perspective diagram and a cross-sectional diagram illustrating a transparent electrode according to a fifth embodiment of the present invention.
Figure 14B:
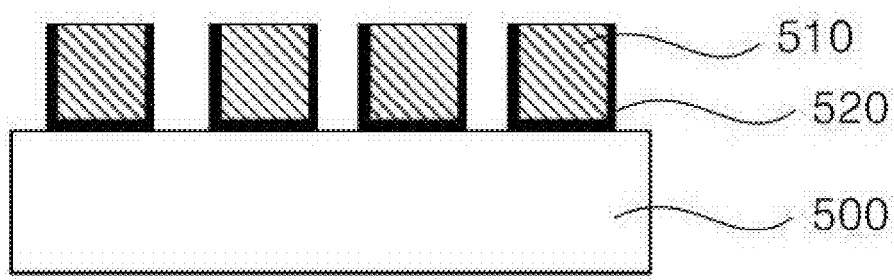

FIGS. 14A and 14B are a perspective diagram and a cross-sectional diagram of the transparent electrode according to the fifth embodiment of the present invention. Referring to FIGS. 14A and 14B, the transparent electrode 5 according to this embodiment is configured to include a substrate 500, a conductive wire 510 having a mesh structure, and a light absorbing layer 520 formed on a lower surface and a partition wall of the conductive wire.

It is preferable that the substrate 500 is a substrate that is made of a substantially flat material having excellent heat resistance and has a transparent property. As an example of the substrate, a glass substrate or the like may be used. In particular, the substrate is required to have heat resistance to such an extent that deformation does not occur at a thermal treatment temperature used in a process for forming the conductive wire having a mesh structure and the light absorption layer.

The conductive wire 510 is configured to have substantially a mesh structure and is made of a conductive material which can be produced by a printing process and has a nano size capable of being implanted into a mesh pattern. As the conductive materials for wire usable as the conductive wire, there may be exemplified conductive inks based on metal nanoparticles, carbon nanotubes, and the like. As the metal nanoparticles, there may be exemplified metal nanoparticles of Ag, Ni, Cu, or the like. In the conductive ink, the metal nanoparticles are dispersed in a solvent, and a cross-linking agent for bonding with a substrate or the like is contained.

The light absorbing layer 520 is made of a material having black characteristic and capable of being subjected to chemical wet etching and is made of a material in which dye or pigment having black characteristic is mixed with a solution polymer material.

The polymer material constituting the light absorbing layer is required to be a polymer material that is capable of being subjected to a solution process and can be selectively wet-etched by a heat-curing property during the thermal treatment. As the polymer material that is capable of being subjected to a solution process and capable of being wet-etched, there may be exemplified polyimide (PI), polymethylmethacrylate (PM), polyhydroxybutyrate (PHB), and the like.

As the dye or pigment having black characteristic constituting the light absorbing layer, carbon black, amido black, 1,5-bis-(4-butylphenylamino)-anthraquinone, or the like may be selectively used.

Therefore, as an example of the material constituting the light absorbing layer, a solution in which carbon black is mixed with polyimide may be used.

On the other hand, in the transparent electrode, the transmittance thereof should not be reduced by the light absorbing layer having black characteristic. Therefore, in order to prevent the reduction in transmittance of the transparent electrode due to the formation of the light absorbing layer, the light absorbing layer and the conductive wire is required to be accurately aligned, and the light absorbing layer is required be formed on the partition wall of the wire with such thickness that the light absorbing layer does not affect the transmittance of the transparent electrode while absorbing the natural light.

Figure 15:
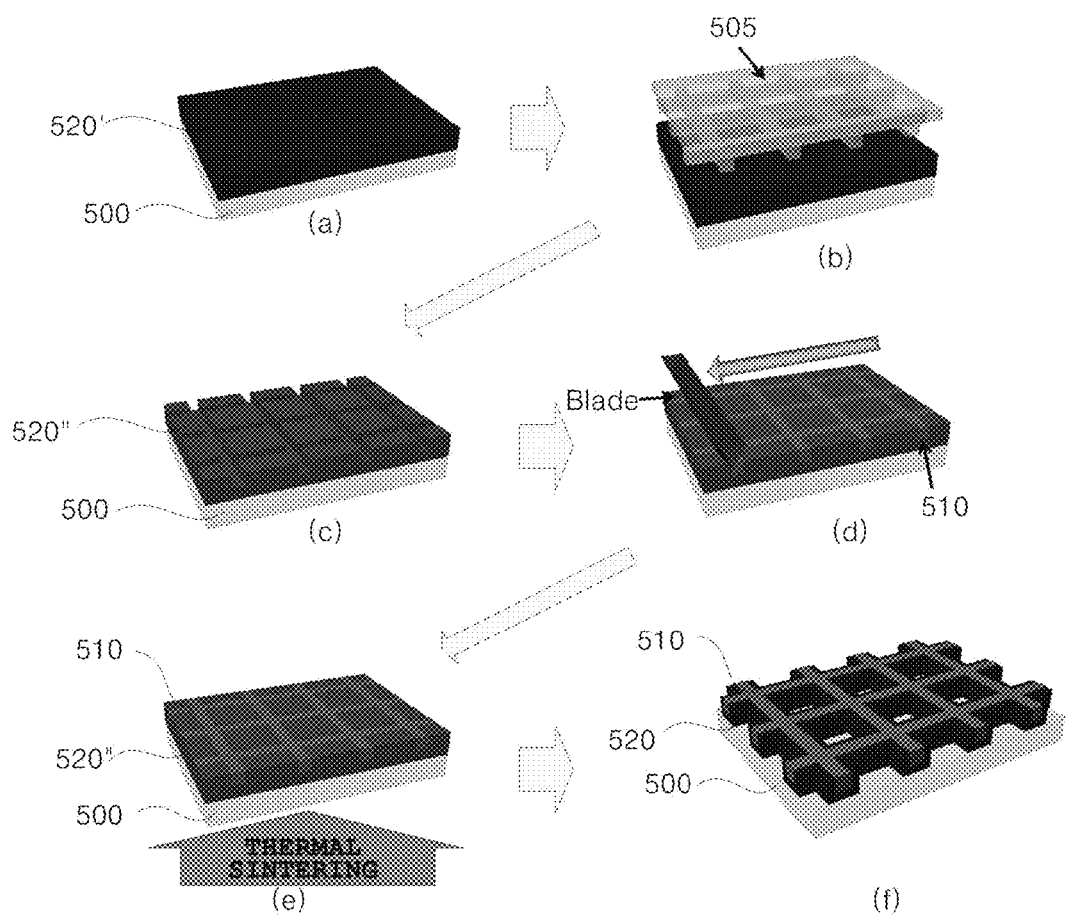
FIG. 15 is a schematic diagram sequentially illustrating processes of a method of manufacturing the transparent electrode according to the fifth embodiment of the present invention.

Hereinafter, the method of manufacturing the transparent electrode according to this embodiment will be described in detail with reference to FIG. 15. FIG. 15 is a schematic diagram sequentially illustrating processes of the method of manufacturing the transparent electrode according to the fifth embodiment of the present invention.

Referring to FIG. 15, first, a buffer layer 520' for an imprinting process is formed on a substrate 500 (a). The material constituting the substrate 500 is the same as that described in the structure of the transparent electrode. The buffer layer 520' is allowed to become the light absorbing layer 520 through the subsequent processes and is made of the same material as that of the above-described light absorbing layer 520. Accordingly, the buffer layer 520' may be made of a material capable of being chemically wet-etched while having black characteristic. For example, a solution in which carbon black is mixed with polyimide may be used.

Next, imprinting is performed by using an elastic stamp 505 having a mesh pattern formed on the buffer layer 520', so that a mesh pattern is formed on the buffer layer 520'. During the imprinting, low temperature thermal treatment is performed at a temperature of about 80° C. As the same time as the imprinting, the low temperature thermal treatment is performed, so that the solvent of the buffer layer is removed, and the solidification is performed. As a result, the buffer layer 520" having a mesh pattern formed on the substrate 500 is implemented (c).

The elastic stamp may be made of a polymer material having elasticity. For example, polydimethylsiloxane (PDMS), polyurethane acrylate (PUA), or the like may be used. Furthermore, the pattern structure formed on the elastic stamp is a mesh type. It is preferable that the width and height of the pattern may be freely controlled. In the elastic stamp for constituting the conductive wire according to the present invention, the line width of the conductive wire is 1, 2, 3, and 4 μm, and the interval between the wire lines is a sum of a gap and a line width of the wire, which may be fixed as 202 μm. Furthermore, the thickness of the wire may be 0.5, 1, 1.5, and 2 μm by controlling the height of the imprinting pattern.

The height and width of the mesh pattern formed on the elastic stamp are determined according to the line width and the aspect ratio required for the conductive wire, and the transmittance and the conductivity of the transparent electrode are determined according to the line width and the aspect ratio of the conductive wire.

Next, a conductive wire 510 is formed by implanting a conductive solution for wire into the mesh pattern 505 of the buffer layer 520" (d). The conductive solution for wire is capable of being subjected to a printing process and is made of nano-sized particles, which can be implanted into a structure such as a mesh pattern and is made of electrically conductive material. As the conductive solution for wire, a conductive ink based on metal nanoparticles or carbon nanotube having an electrically conductive property may be used. As the conductive ink, an ink in which metal nanoparticles of Ag, Ni, Cu, or the like are dispersed may be used. On the other hand, in order to implant the conductive solution for wire into the mesh pattern, a blade method may be applied.

Next, a primary thermal sintering process is performed (e). The primary thermal sintering is performed in order to adsorb the conductive solution for wire to the substrate or the buffer layer, to remove the solvent of the conductive solution for wire, and to induce solidification. Therefore, it is preferable that the primary thermal sintering temperature is a temperature at which the buffer layer is not completely thermally denatured and, in the buffer layer adjacent to the conductive wire having high thermal conductivity, local thermal denaturation can be induced. On the other hand, with respect to the buffer layer, for the etching process to be performed after the primary thermal sintering, the primary thermal sintering temperature is required to be equal to or lower than such a temperature at which the complete thermal denaturation of the materials constituting the buffer layer is induced.

In the case where the buffer layer is made of a solution containing a mixture of polyimide and carbon black, it is preferable that the primary thermal sintering process is performed at a temperature between 180° C. and 200° C., which is a temperature at which wet-etching can be performed and partial imidization can be performed later.

Next, the buffer layer is wet-etched to form a light absorbing layer having a form of a thin film on the side surface and the lower surface of the conductive wire having a mesh structure (f). During the primary thermal sintering process, due to the high thermal conductivity of the material constituting the conductive wire, high temperature thermal treatment is locally performed in the buffer layer in the peripheral region adjacent to the conductive wire. As a result, in the constituent materials of a buffer layer located in the peripheral region of the wire, due to the localized high temperature thermal treatment, the thermal denaturation locally occurs. As a result, the bonding force of the buffer layer in the peripheral region of the wire is increased due to the thermal deformation, and thus, even if the subsequent wet etching process is performed on the buffer layer, the buffer layer remains without being etched. Therefore, the buffer layer remains thinly in the peripheral region of the wire, so that the light absorbing layer 520 having a form of a thin film is formed.

The solution for wet etching the buffer layer is required to be determined as a solution that does not affect the structure and conductivity of the implanted conductive solution for wire. For example, a potassium hydroxide solution diluted with distilled water which is a solution used as a developer of photoresist (DI water) may be used.

Next, in order to improve the conductivity of the transparent electrode, a second thermal sintering process is performed (g). Since the second thermal sintering process is a sintering treatment for improving the conductivity of the conductive solution for wire, the thermal treatment temperature is preferably as high as possible. However, the second thermal sintering process is required to be performed under a temperature condition in which the black characteristic of the buffer layer is not discolored. For example, in the case where the buffer layer contains carbon black, the buffer layer is capable of being subjected to maximum high temperature treatment under a temperature condition in which discoloration of carbon black does not occur. The temperature of about 200° C. to 250° C. can be set. "Sintering" denotes the phenomenon that, in the case where strong external energy is exerted to powder, the powder is solidified by bonding between particles. In the case where a conductive ink is made of metal nanoparticles, when the sintering process is performed, the metal nanoparticles are bonded to each other, and thus, the particle size becomes larger, so that ideally voids do not exist. In addition, in order to improve dispersion stability, the coated material is disintegrated to disappear on the surface of the particles, and thus, the conductivity can be maximized.

Hereinafter, a portion of the processes used in the method of manufacturing the transparent electrode according to the fifth embodiment of the present invention will be described in more detail with reference to FIGS. 16A to 17C.

Figure 16A:
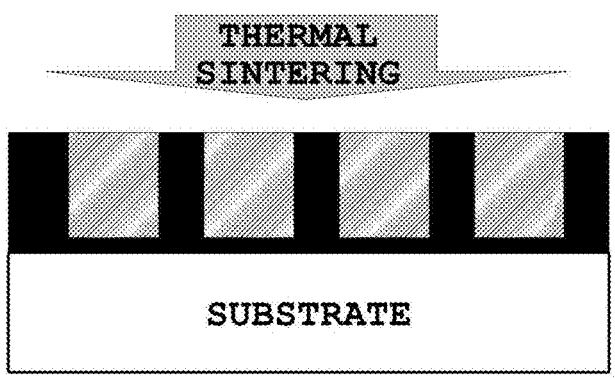
FIGS. 16A and 16B are a conceptual diagram illustrating that, in a method of manufacturing a transparent electrode according to the fifth embodiment of the present invention, due to the occurrence of thermal denaturation in a buffer layer in the peripheral region of a wire, the peripheral region remains without being etched in the subsequent etching processes, so that a light absorbing layer is formed.
Figure 16B:
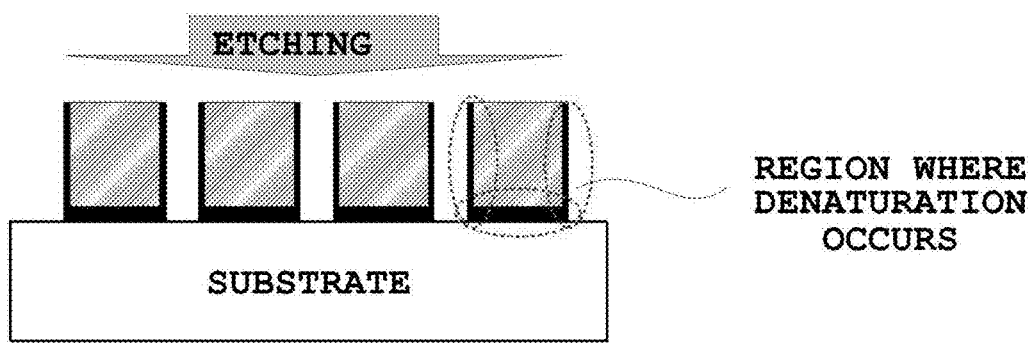

During the primary thermal sintering process, due to excellent thermal conductivity of the conductive material constituting the conductive wire, high temperature thermal treatment is locally performed in the buffer layer adjacent to the wire, so that thermal denaturation occurs in the buffer layer in the peripheral region of the wire. FIGS. 16A and 16B are conceptual diagrams illustrating that, in a method of manufacturing a transparent electrode according to the fifth embodiment of the present invention, a bonding force of the buffer layer in the peripheral region of the wire is increased due to the occurrence of thermal denaturation, the peripheral region remains without being etched in the subsequent etching processes, so that a light absorbing layer having a form of a thin film is formed. Referring to FIG. 16A, during the primary thermal sintering process, due to the high temperature thermal treatment generated locally, the buffer layer in the periphery of the wire is locally thermally denatured in the buffer layer in the periphery of the wire, so that the bonding power is improved. As a result, as illustrated in FIG. 16B, in the process of selectively etching the buffer layer, the buffer layer in the periphery of the wire where the thermal denaturation occurs remains without being etched, so that a light absorbing layer having a form of a thin film is formed.

Figure 17A:
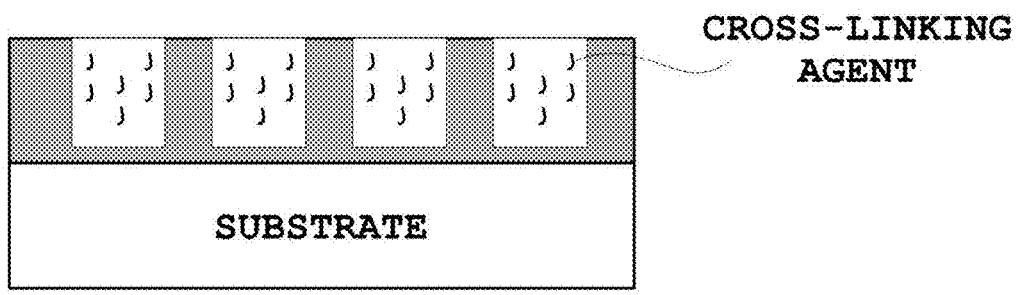
FIGS. 17A to 17C are conceptual diagrams illustrating that, in a method of manufacturing a transparent electrode according to the fifth embodiment of the present invention, in the case where a cross-linking agent is contained in a conductive material for wire, during a primary thermal sintering process, the cross-linking agent and constituent materials of a buffer layer are adsorbed to each other, the buffer layer in the peripheral region of the wire remains without being etched in the subsequent etching processes.
Figure 17B:
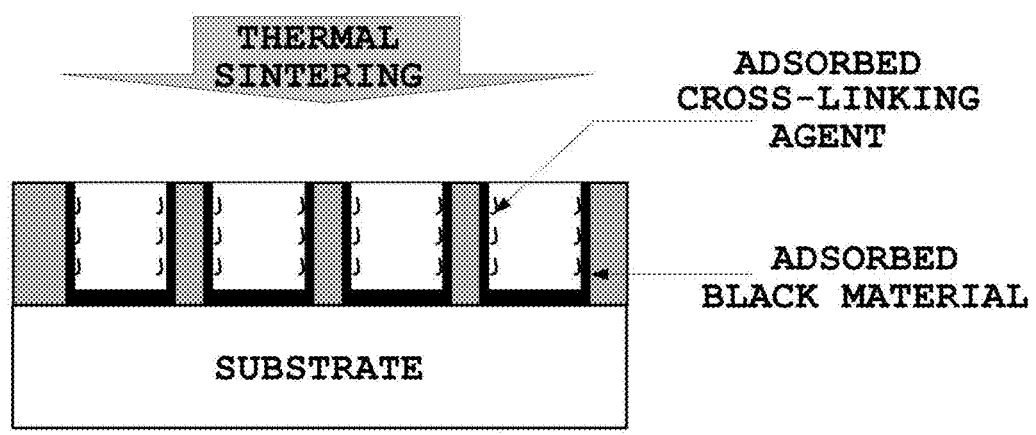
Figure 17C:
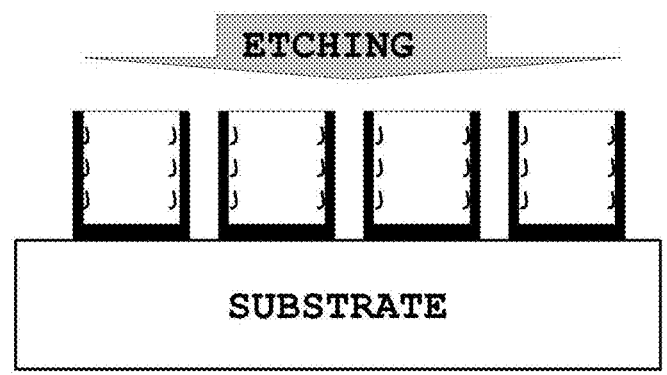

Furthermore, during the primary thermal sintering, in the case where the cross-linking agent is contained in the conductive solution for wire constituting the conductive wire, the cross-linking agent of the conductive solution for wire and the constituent material of the buffer layer are adsorbed to each other. In particular, in the case where the conductive solution for wire is a conductive ink containing metal nanoparticles, a cross-linking agent is contained. FIGS. 17A to 17C are conceptual diagrams illustrating that, in a method of manufacturing a transparent electrode according to the fifth embodiment of the present invention, during the primary thermal sintering process, the cross-linking agent and the constituent materials of the buffer layer are adsorbed to each other, the buffer layer in the peripheral region of the wire remains without being etched in the subsequent etching processes. Referring to FIGS. 17A to 17C, during the primary thermal sintering process, since the cross-linking agent of the conductive wire and the constituent materials of the buffer layer in the peripheral region of the wire are adsorbed to each other, even in the case where a selective etching process is performed, the buffer layer located on the partition wall of the wire remains without being etched, so that a light absorbing layer is formed.

[Sixth Embodiment]

In a structure of a transparent electrode based on a mesh structure according to a sixth embodiment of the present invention, a light absorbing layer is formed on an upper surface, a lower surface, and a partition wall of a conductive wire.

Figure 18A:
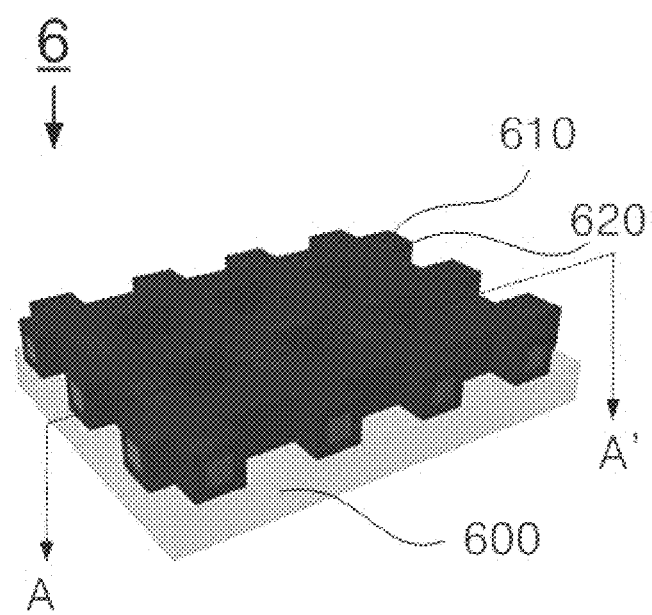
FIGS. 18A and 18B are a perspective diagram and a cross-sectional diagram illustrating a structure of a transparent electrode based on a mesh structure according to a sixth embodiment of the present invention.
Figure 18B:
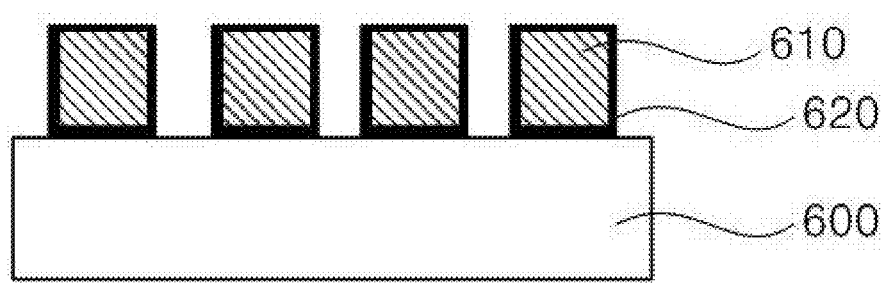

FIGS. 18A and 18B are a perspective diagram and a cross-sectional diagram illustrating the structure of the transparent electrode based on a mesh structure according to the sixth embodiment of the present invention. Referring to FIGS. 18A and 18B, the structure of the transparent electrode 6 according to this embodiment is the same as the structure of the transparent electrode according to the fifth embodiment except that a light absorbing layer 620 is formed on the upper surface of the conductive wire 610 as well as the lower surface and partition wall of the conductive wire 610.

Figure 19:
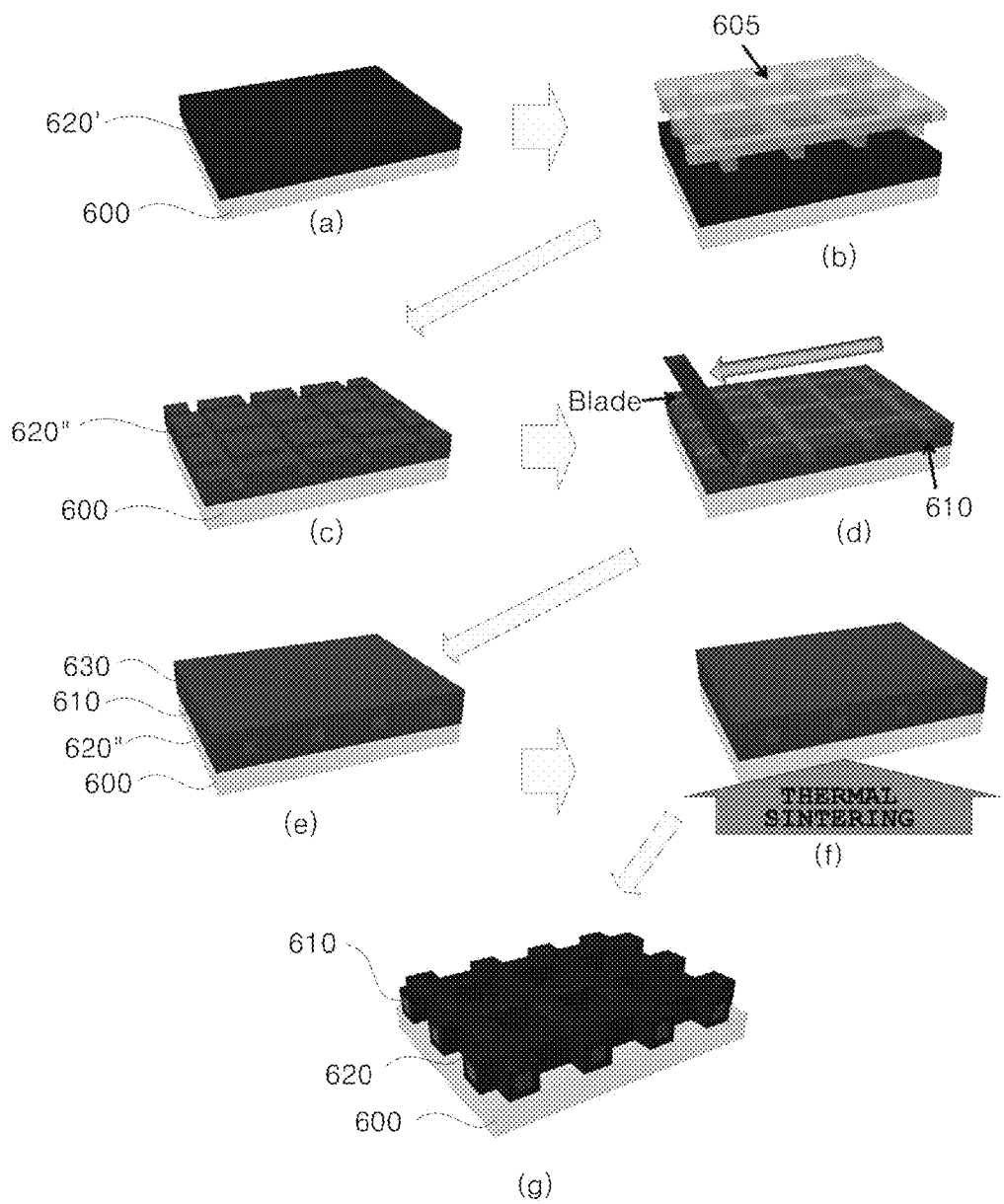
FIG. 19 is a schematic diagram sequentially illustrating processes of a method of manufacturing the structure of the transparent electrode according to the sixth embodiment of the present invention.

FIG. 19 is a schematic diagram sequentially illustrating processes of a method of manufacturing the structure of the transparent electrode according to the sixth embodiment of the present invention. Referring to FIG. 19, the processes of manufacturing the transparent electrode according to this embodiment is the same as those of the fifth embodiment except for further including a process of implanting the conductive solution for wire into a mesh pattern of the buffer layer 620" to form a conductive wire 610, and after that, forming an additional buffer layer 630 on the upper portion of the conductive wire (step (e) in FIG. 19). Spin coating, bar coating, deep coating, or the like may be used to further provide an additional buffer layer on the conductive wire.

According to the method of manufacturing the transparent electrode according to this embodiment, a light absorbing layer 620 having black characteristic is formed on the upper surface, the lower surface, and the partition wall of the conductive wire 610.

As described above, in order to solve the trade-off relationship between the conductivity and the transmittance of the method of manufacturing the transparent electrode in the related art, in the method of manufacturing the transparent electrode according to the sixth embodiment of the present invention, the imprinting method facilitating the control of the line width and thickness of the wire and the process of implanting the conductive material for wire are applied. Accordingly, in order to improve both the transmittance and the conductivity of the transparent electrode, in the method of manufacturing the transparent electrode according to the present invention, a mesh pattern is imprinted on a buffer layer, and after that, a conductive material for wire is implanted into the mesh pattern formed by the imprinting.

Figure 20:
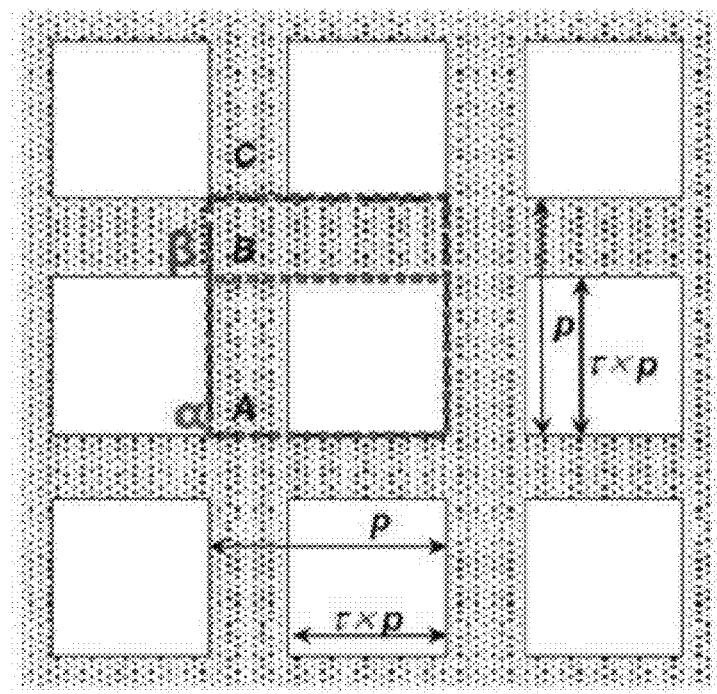
FIG. 20 is a structural diagram illustrating transmittance and conductivity of a transparent electrode based on a general mesh structure.

FIG. 20 is a structural diagram illustrating the transmittance and the conductivity of a general transparent electrode based on a mesh structure. The transmittance and the conductivity of the transparent electrode illustrated in FIG. 20 are determined by Mathematical Formula (1).

[Mathematical Formula 1]
$$T_{mesh} = \frac{(\tau \times p)^2}{p^2} \tau^2$$

$$R_{sq} = \frac{\rho_{conductive}}{t_{mesh}}$$

$$R_{sq} \approx R_\alpha + R_\beta = \frac{\tau \times p}{p - \tau \times p} R_{sq} + R_{sq}$$

The definition of parameters illustrated in the above Mathematical Formula (1) is as follows.

$T_{mesh}$ denotes transmittance of a transparent electrode having a mesh structure. $R_{sq}$ denotes sheet resistance characteristic of the transparent electrode having the mesh structure according to the present invention, and in the case of tmesh, $R_{sq}$ denotes thickness of a wire constituting the mesh structure. $R_\alpha$ and $R_\beta$ denote sheet resistance characteristics for the α region and the β region illustrated in FIG. 20, respectively.

Herein, τ×ρ denotes a portion where a wire is not formed in the mesh structure, and ρ is a sum of portions where wires are formed and wires are not formed within a predetermined unit area.

In order to realize formation of a transparent electrode having high transmittance based on a mesh structure, the value of τ×ρ in the unit area (α+β) illustrated in FIG. 8 is required to be maximized. However, in the case of ρ, since ρ is a numerical value that determines the unit area, so that τ×ρ cannot be larger than ρ.

Namely, in the case where the transparent electrode based on the mesh structure is manufactured, the transmittance is improved as the area occupied by the conductive material within the unit area is minimized. Therefore, in order to minimize the area occupied by the conductive wire within the unit area, the line width constituting the mesh structure need to be finely implemented. In addition, in order to secure the visibility of the user, the line width of the mesh structure is required to be 3 µm or less. In the method of manufacturing the transparent electrode according to the present invention, fine wires of 3 µm or less for ensuring the visibility to the screen of the display can be easily formed, and a stamp based on an elastic body is used, so that the present invention can be applied to a roll-to-roll process. Therefore, the present invention has an advantage in terms of mass production.

Figure 21:
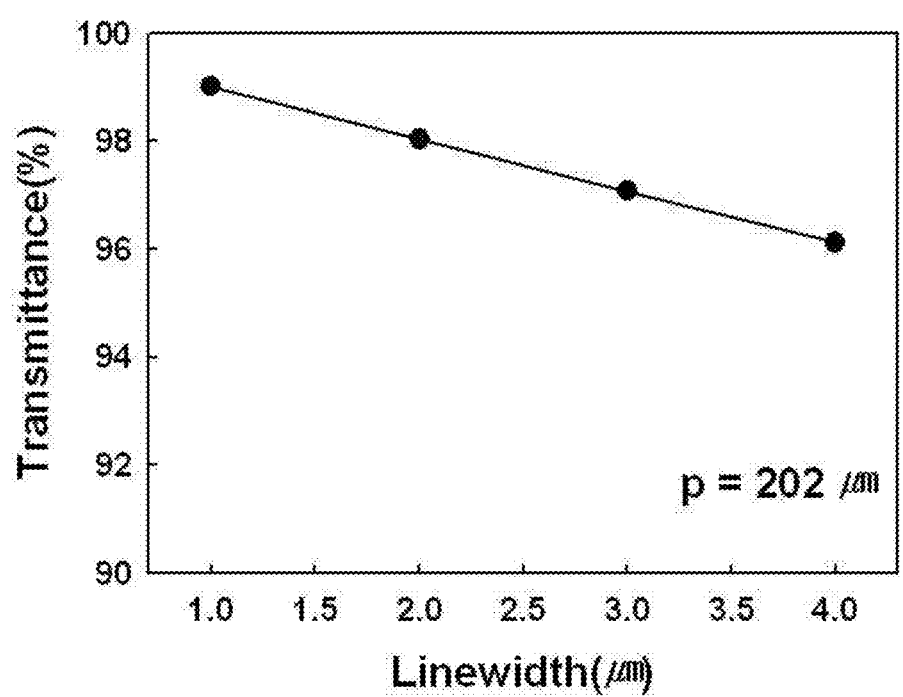
FIG. 21 is a graph illustrating a change in transmittance according to a line width of wire in a mesh structure.

FIG. 21 is a graph illustrating a change in transmittance according to the line width of the wire in the mesh structure. Referring to FIG. 21, in the case where the line width of the conductive wire having a mesh structure is changed in the equal pitch condition under the assumption that the transmission characteristic of the conductive material for wire constituting the mesh structure is very low, it can be understood that, as the line width of the conductive wire is small, the transmittance of the transparent electrode are improved.

Figure 22:
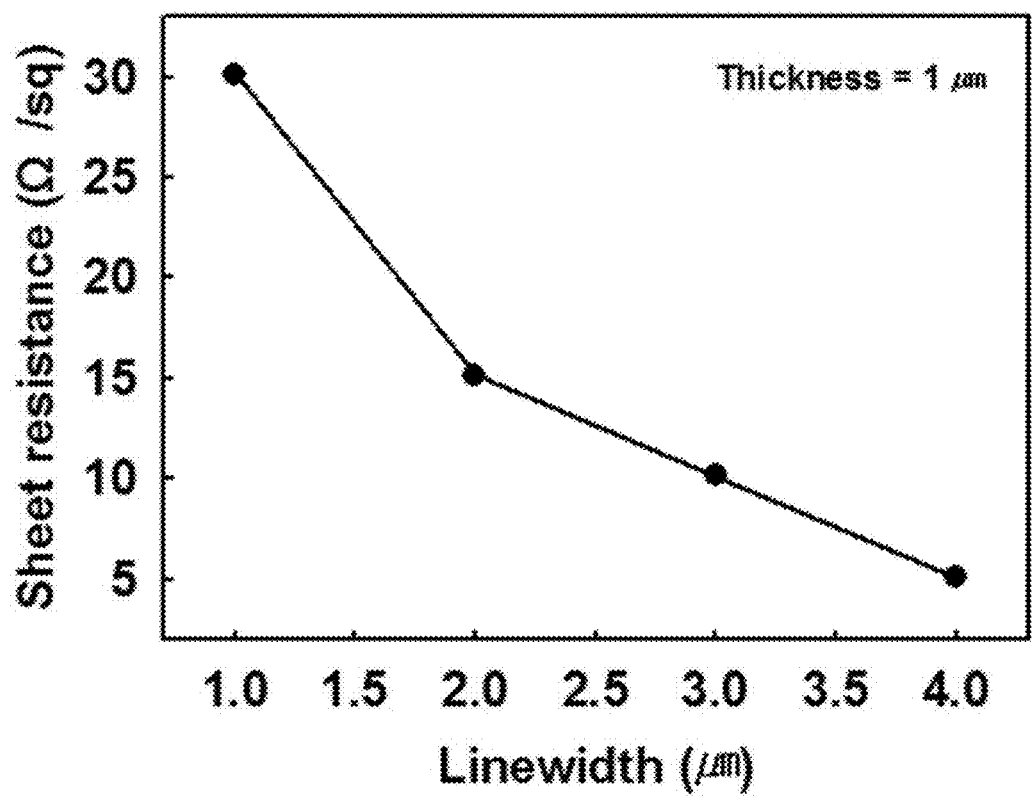
FIG. 22 is a graph illustrating a change in sheet resistance characteristic according to a line width of wire in a mesh structure.

However, if the line width of the conductive wire forming the mesh structure is made finer, the transmittance is improved. However, the sheet resistance is increased, and thus, the conductivity is lowered. FIG. 22 is a graph illustrating a change in conductivity (sheet resistance) characteristic according to the line width of the wire in the mesh structure.

In order to solve the trade-off relationship between the transmittance and the conductivity as described above, the parameters other than the line width and the pitch of the lines are required to be controlled. In order to realize the high transmittance and high conductivity of the transparent electrode, a method of optimizing the thickness of the wire in the mesh to improve the conductivity while reducing the line width of the conductive wire can be used. However, in the case of the printing process method in the related art, although the line width of the wire can be miniaturized, the thickness of the wire may be limited to tens to hundreds of nanometers I due to limitations by the process and the material characteristic.

Table 1 is a chart illustrating line widths and thicknesses of conductive wires that can be implemented in each printing process.

TABLE 1

| Technique | Thickness | Width |
| --- | --- | --- |
| Gravure | 0.8 µm~8 µm | 3 µm~100 µm |
| Offset | 0.5 µm~1.5 µm | 2 µm~50 µm |
| Screen | 30 µm~100 µm | 20 µm~100 µm |
| Inkjet | <0.5 µm | 20 µm~50 µm |
| Imprinting | 0.01 µm~hundreds of µm | 0.01 µm~hundreds of µm |

In Table 1, in the case where the imprinting process is used like the present invention, since the structure of the stamp to be applied during the imprinting, namely, since the width and height of the pattern can be freely controlled, unlike the existing manufacturing method based on the printing process, It is possible to form a wire having a thickness of several µm, and by using a stamp based on an elastic body, the present invention can be applied to a roll-to-roll process, and mass productivity can be improved.

Figure 23:
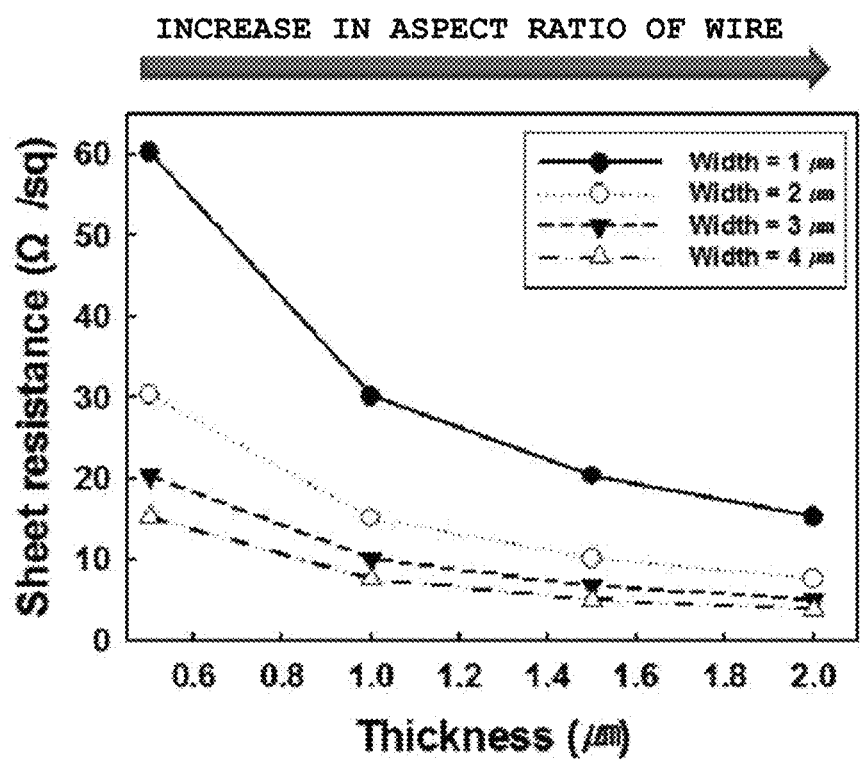
FIG. 23 is a graph illustrating a change in sheet resistance due to the line width of wire in a mesh structure and the thickness of each wire and illustrates conductivity as an aspect ratio of wire increases.

FIG. 23 is a graph illustrating a change in conductivity (sheet resistance) due to the line width of wire in a mesh structure and the thickness of each wire and illustrates conductivity as an aspect ratio of wire is increased. Referring to FIG. 23, it can be understood that the conductivity is improved as the aspect ratio (that is, thickness/line width of wire) of the conductive wire is increased. Furthermore, irrespective of the line width of the wire constituting the mesh structure, as the thickness of each wire becomes larger, namely, as the aspect ratio of the wire becomes larger, the conductivity is improved without changing the transmittance, the trade-off relationship can be solved, and high conductivity and high transmittance may be realized at the same time.

Figure 24:
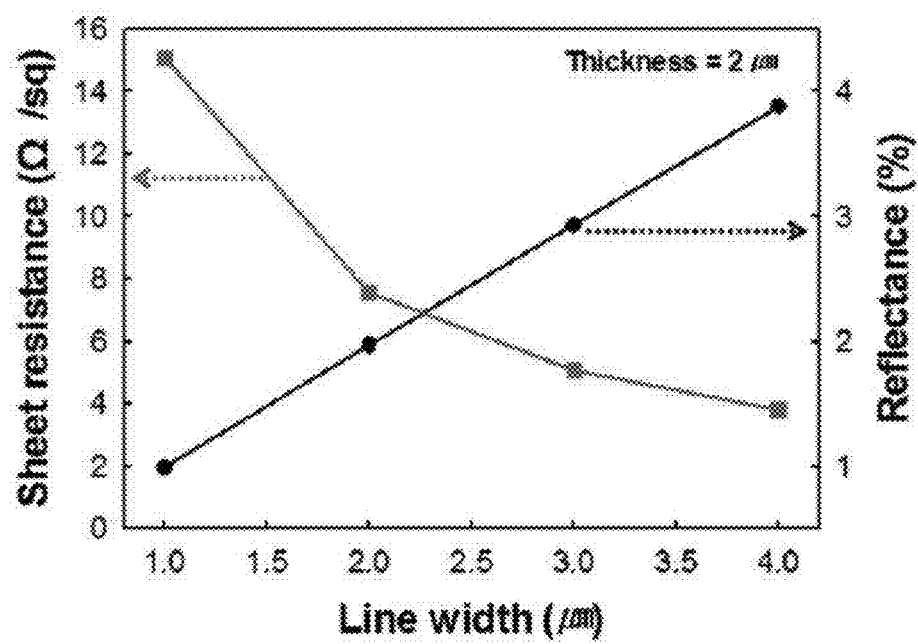
FIG. 24 is a graph illustrating relationships of sheet resistance characteristic and reflectance characteristic according to a change in line width of wire.

FIG. 24 is a graph illustrating the relationship between sheet resistance characteristic and reflectance characteristic according to a change in wire line width. Referring to FIG. 24, it can be understood that, as the line width of the wire is increased, the sheet resistance is decreased, but the reflectance is increased. Therefore, in the case where the conductive wire is formed thick in order to improve the conductivity of the transparent electrode, reflection occurs in natural light coming not only on the front surface of the conductive wire but also on the side surface. Thus, the reflection of natural light on the front surface and the side surface of the conductive wire acts as a factor that hinders the visibility of the user.

In a structure of a transparent electrode based on a metal mesh in the related art in which only the metal wire is formed, light is reflected by the metal wire and the visibility is deteriorated. However, in the structure of the transparent electrode based on a metal mesh according to the sixth embodiment of the present invention, as the light absorbing layer is formed on the upper surface/lower surface and the partition wall of the conductive wire, and thus, the light absorbing layer absorbs natural light, so that the visibility to the screen of the display is improved. On the other hand, in the structure of the transparent electrode based on a metal mesh in the related art in which only the metal wire is formed, even in the case where the metal wire is formed on the lower portion of the transparent substrate, light is reflected by the metal wire, and thus, the visibility is deteriorated. However, in the structure of the transparent electrode based on a metal mesh according to the fifth embodiment of the present invention, as the light absorbing layer is formed on the lower surface and the partition wall of the conductive wire, the light absorbing layer absorbs natural light, so that the visibility is improved.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

INDUSTRIAL APPLICABILITY

A transparent electrode according to the present invention and a method of manufacturing the same can be widely used for a touch screen panel as input devices of mobile apparatuses or IT apparatuses.

The invention claimed is:

1. A transparent electrode based on a metal material comprising:
   a transparent substrate;
   a metal wire formed on the transparent substrate, the metal wire made of a metal material which is thermally sintered; and
   a light absorbing layer having black characteristic and formed on all or a portion of a surface of the metal wire, wherein the light absorbing layer is made of a photoreactive material which is thermally denatured due to a thermal conductivity of the metal material during a thermal sintering process not to induce photolysis by UV light irradiation,
   wherein light reflectance due to the metal wire is reduced.

2. The transparent electrode based on a metal material according to claim 1, wherein the metal wire is made of one of a conductive ink based on metal nanoparticles and a metal nanowire dispersion solution.

3. The transparent electrode based on a metal material according to claim 1, wherein the metal wire is made of metal nanowires, and
   wherein the light absorbing layer is located on a lower surface of the metal wire or located on an upper surface, a lower surface, and a partition wall of the metal wire.

4. The transparent electrode based on a metal material according to claim 1, wherein the metal wire is formed in a metal mesh structure based on metal nanoparticles, and
   wherein the light absorbing layer is located on a lower surface and a partition wall of the metal wire or located on a lower surface, an upper surface and a partition wall of the metal wire.

5. The transparent electrode based on a metal material according to claim 1, wherein the light absorbing layer is made of a mixed solution of a polymer material capable of being subjected to a solution process and having a photoreactive property and a dye or a pigment having black characteristic.

6. A method of manufacturing a transparent electrode based on a metal material, comprising steps of:
   (a) applying a material having black characteristic to a transparent substrate to form a buffer layer;
   (b) imprinting a stamp having a predetermined mesh pattern on the buffer layer and performing thermal treatment to form a mesh pattern on the buffer layer;
   (c) implanting a conductive solution for wire into the mesh pattern of the buffer layer to form a metal wire having a mesh structure;
   (d) performing a primary thermal sintering process to remove a solvent of the conductive solution for wire and induce solidification;
   (e) performing UV light irradiation on the buffer layer by using the metal wire as a mask; and
   (f) forming a light absorption layer on a partition wall and between a lower surface of the metal wire and the transparent substrate by etching selectively the buffer layer self-masked by the metal wire and irradiated with light, and
   wherein the light absorbing layer is made of a photoreactive material which is thermally denatured due to a thermal conductivity of the metal material during the primary thermal sintering process not to induce photolysis during the UV light irradiation.

7. The method according to claim 6, further comprising a step of forming an additional buffer layer on an upper surface of the metal wire having a mesh structure after the step (c),
   wherein the step (f) includes forming the light absorption layer on the upper surface, the lower surface, and the partition wall of the metal wire.

8. A method of manufacturing a transparent electrode based on a metal material, comprising steps of:
   (a) forming a buffer layer by applying a material having black characteristic to a transparent substrate and performing thermal treatment;
   (b) applying a metal nanowire dispersion solution to a surface of the buffer layer to form a metal nanowire layer;
   (c) performing a primary thermal sintering process to adhere the metal nanowire layer to the buffer layer;
   (d) performing UV light irradiation on the buffer layer by using the metal nanowire layer as a mask; and
   (e) etching selectively the buffer layer self-masked by the metal nanowire layer to form a light absorbing layer between lower surfaces of the metal nanowires and the transparent substrate,
   wherein the light absorbing layer is made of a photoreactive material which is thermally denatured due to a thermal conductivity of the metal nanowire layer during the primary thermal sintering process not to induce photolysis during the UV light irradiation.

9. The method according to claim 8, further comprising a step of forming an additional buffer layer by applying a material having black characteristic to an upper surface of the metal nanowire layer after step (b),
   wherein the step (e) includes forming the light absorbing layer on lower surfaces, upper surfaces, and partition walls of the metal nanowires.

10. The method according to claim 6, wherein the buffer layer is made of a mixed solution of a polymer material capable of being subjected to a solution process and having a photoreactive property and a dye or a pigment having black characteristic.

11. The method according to claim 6, wherein a thermal sintering temperature in the step of performing the primary thermal sintering process is a temperature at which the buffer layer can maintain a state in which thermal denaturation can occur by UV light irradiation, a solvent of the metal wire can be removed, and solidification can be induced.

12. The method according to claim 6, wherein the conductive solution for wire is made of a nano-sized material capable of being subjected to a printing process and capable of being implanted into a mesh pattern and having electrical conductivity.

13. The method according to claim 6, wherein a thermal treatment temperature in the step of performing the primary thermal sintering process is a temperature at which a cross-linking agent of the conductive solution for wire and the buffer layer adjacent to the metal wire are adsorbed to each other and the buffer layer can maintain a state in which thermal denaturation can occur by the UV light irradiation.

14. The method according to claim 6, further comprising a step of performing a secondary thermal sintering process after the light absorbing layer is formed on a surface of the metal wire by etching the buffer layer, to improve conductivity of the metal wire.

15. The method according to claim 14, wherein a thermal treatment temperature in the step of performing the secondary thermal sintering process is a temperature equal to or lower than a melting temperature of a material constituting the buffer layer.

* * * * *